(12) United States Patent
Lei et al.

(10) Patent No.: US 12,200,777 B2
(45) Date of Patent: Jan. 14, 2025

(54) ADAPTIVE RETRANSMISSION FOR A RANDOM ACCESS PROCEDURE

(71) Applicant: Qualcomm Incorporated, San Diego, CA (US)

(72) Inventors: Jing Lei, San Diego, CA (US); Wanshi Chen, San Diego, CA (US); Joseph Binamira Soriaga, San Diego, CA (US); Linhai He, San Diego, CA (US); Ruiming Zheng, Beijing (CN); Seyong Park, San Diego, CA (US); Yiqing Cao, Beijing (CN); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 17/616,764

(22) PCT Filed: Jun. 7, 2019

(86) PCT No.: PCT/CN2019/090449
§ 371 (c)(1),
(2) Date: Dec. 6, 2021

(87) PCT Pub. No.: WO2020/243977
PCT Pub. Date: Dec. 10, 2020

(65) Prior Publication Data
US 2022/0312501 A1    Sep. 29, 2022

(51) Int. Cl.
*H04W 74/08*    (2024.01)
*H04L 1/08*    (2006.01)
(Continued)

(52) U.S. Cl.
CPC .......... *H04W 74/0841* (2013.01); *H04L 1/08* (2013.01); *H04W 56/001* (2013.01);
(Continued)

(58) Field of Classification Search
CPC .... H04L 1/1867; H04L 1/08; H04W 72/0453; H04W 74/0841; H04W 74/0866; H04W 56/001; H04W 72/0446; H04W 74/0833
See application file for complete search history.

(56) References Cited

U.S. PATENT DOCUMENTS

| 10,631,330 B2 | 4/2020 | Vajapeyam et al. |
| 2018/0359783 A1 | 12/2018 | Abedini et al. |

(Continued)

FOREIGN PATENT DOCUMENTS

| CN | 109392066 A | 2/2019 |
| CN | 109392107 A | 2/2019 |

(Continued)

OTHER PUBLICATIONS

Huawei, et al., "Discussion on 2-step RACH Procedure", 3GPP Draft, R1-1906051, 3GPP TSG RAN WG1 Meeting #97, 3rd Generation Partnership Project (3GPP), Mobile Competence Centre, 650, Route Des Lucioles, F-06921 Sophia-Antipolis Cedex, France vol. RAN WG1, No. Reno, USA, May 13, 2019-May 17, 2019, May 13, 2019 (May 13, 2019), X051727508, 12 pages, Retrieved from the Internet: URL:http://www.3gpp.org/ftp/Meetings%5F3GPP%5FSYNC/RAN1/Docs/R1%2D1906051%2Ezip [retrieved on May 13, 2019] Chapter 3.4, sections 2-4.

(Continued)

*Primary Examiner* — Brian D Nguyen
(74) *Attorney, Agent, or Firm* — QUALCOMM Incorporated

(57) ABSTRACT

Methods, systems, and devices for wireless communications are described. A user equipment (UE) may determine a configuration of a retransmission of a first message of a random access procedure based on a set of transmission configuration options transmitted by a base station. For example, the UE may transmit the first message but may reconfigure the first message for the retransmission based on (Continued)

the transmission configuration options. Additionally, the UE may configure a set of transmission configuration states based on the transmission configuration options for transmitting/retransmitting the first message. In some cases, the UE may determine to switch transmission configuration states based on a trigger signaled by the base station and/or a determination by the UE. Additionally, the UE may transmit an indication of a log of state transitions performed prior to a retransmission of the first message to facilitate combining of the retransmissions at the base station.

70 Claims, 21 Drawing Sheets

(51) Int. Cl.
  *H04W 56/00* (2009.01)
  *H04W 72/04* (2023.01)
  *H04W 72/0446* (2023.01)
  *H04W 72/0453* (2023.01)
  *H04W 74/0833* (2024.01)

(52) U.S. Cl.
  CPC ... *H04W 72/0446* (2013.01); *H04W 72/0453* (2013.01); *H04W 74/0866* (2013.01)

(56) References Cited

U.S. PATENT DOCUMENTS

| | | | |
|---|---|---|---|
| 2019/0116613 A1 | 4/2019 | Abedini et al. | |
| 2019/0289661 A1* | 9/2019 | Chen | H04W 24/10 |
| 2020/0260498 A1* | 8/2020 | Xu | H04W 74/0833 |
| 2021/0022053 A1* | 1/2021 | Cirik | H04W 36/0069 |
| 2022/0022140 A1* | 1/2022 | Xing | H04W 74/0833 |
| 2022/0070938 A1* | 3/2022 | Wu | H04L 1/189 |
| 2024/0073954 A1* | 2/2024 | Dinan | H04W 74/0833 |

FOREIGN PATENT DOCUMENTS

| | | |
|---|---|---|
| CN | 109600842 A | 4/2019 |
| JP | 2016219891 A | 12/2016 |
| WO | WO-2015005701 A1 | 1/2015 |
| WO | WO-2016161408 | 10/2016 |
| WO | WO-2018064367 A1 | 4/2018 |
| WO | WO-2018118531 A1 | 6/2018 |
| WO | WO-2018128064 A1 | 7/2018 |
| WO | 2020200273 A1 | 10/2020 |

OTHER PUBLICATIONS

International Search Report and Written Opinion—PCT/CN2019/090449—ISA/EPO—Feb. 6, 2020.
CAICT: "Considerations on Procedure for Two-step RACH," 3GPP TSG RAN WG1 Meeting #97, R1-1907197, 3rd Generation Partnership Project, Mobile Competence Centre, 650, Route Des Lucioles, F-06921, Sophia-Antipolis Cedex, France, vol. RAN WG1. No. Reno, USA, May 13, 2019-May 17, 2019, May 13, 2019, XP051728640, 8 pages, sections 2 to 2.3, subclause 2.3 Fallback scheme, figure 2.
Supplementary European Search Report—EP19931939—Search Authority—The Hague—Dec. 8, 2022.
Taiwan Search Report—TW109118769—TIPO—Dec. 6, 2023.
Taiwan Search Report—TW109118769—TIPO—Sep. 21, 2024.

* cited by examiner

ADAPTIVE RETRANSMISSION FOR A RANDOM ACCESS PROCEDURE

BACKGROUND

The following relates generally to wireless communications, and more specifically to adaptive retransmission for a random access (e.g., random access channel (RACH)) procedure.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). When connecting to a base station to receive and/or transmit subsequent communications, a UE may perform a RACH procedure to establish a connection with the base station. Efficient techniques are desired for determining configuration information for one or more messages of the RACH procedure.

SUMMARY

The described techniques relate to improved methods, systems, devices, and apparatuses that support adaptive retransmission for a random access (e.g., RACH) procedure. Generally, the described techniques provide for a UE to determine a configuration for a retransmission of a first random access message based on a set of transmission configuration options transmitted by a base station as part of a random access (e.g., a two-step RACH) procedure with the base station. For example, a first transmission of the first random access message may fail (e.g., due to the two-step RACH procedure being a contention-based multiple access procedure, channel impairments, interference, or a combination thereof). As such, the UE may retransmit the first random access message but may reconfigure the first random access message for the retransmission (e.g., use a different configuration than the first transmission) to improve the performance and chances the two-step RACH procedure is completed with the retransmission, where the reconfiguration is based on the transmission configuration options transmitted by the base station. Accordingly, if the UE determines to reconfigure the first random access message for the retransmission, the UE may signal this change to the base station (e.g., implicitly or explicitly).

Additionally, the UE may configure a set of transmission configuration states based on the transmission configuration options, where the first transmission of the first random access message and any subsequent retransmissions may use a same or different transmission configuration state and each transmission configuration state has at least one different transmission parameter from the other transmission configuration states. In some cases, the UE may determine to switch transmission configuration states based on a trigger signaled by the base station and/or a determination by the UE. Additionally, the UE may transmit an indication of a log of state transitions performed prior to a retransmission of the first random access message (e.g., transmission parameters used by preceding transmissions of the first random access message before the retransmission). Accordingly, the base station may use the log of state transitions to combine at least a subset of the transmissions and retransmissions of the first random access message (e.g., as part of an interference cancellation).

A method of wireless communications at a UE is described. The method may include receiving, from a base station, a message indicating a set of transmission configuration options for retransmitting a first random access message of a random access procedure (e.g., msgA transmission), determining to perform a retransmission of the first random access message based on a retransmission trigger, and retransmitting, to the base station, the first random access message based on the set of transmission configuration options and the retransmission trigger.

An apparatus for wireless communications at a UE is described. The apparatus may include a processor, memory coupled with the processor, and instructions stored in the memory. The instructions may be executable by the processor to cause the apparatus to receive, from a base station, a message indicating a set of transmission configuration options for retransmitting a first random access message of a random access procedure, determine to perform a retransmission of the first random access message based on a retransmission trigger, and retransmit, to the base station, the first random access message based on the set of transmission configuration options and the retransmission trigger.

Another apparatus for wireless communications at a UE is described. The apparatus may include means for receiving, from a base station, a message indicating a set of transmission configuration options for retransmitting a first random access message of a random access procedure, determining to perform a retransmission of the first random access message based on a retransmission trigger, and retransmitting, to the base station, the first random access message based on the set of transmission configuration options and the retransmission trigger.

A non-transitory computer-readable medium storing code for wireless communications at a UE is described. The code may include instructions executable by a processor to receive, from a base station, a message indicating a set of transmission configuration options for retransmitting a first random access message of a random access procedure, determine to perform a retransmission of the first random access message based on a retransmission trigger, and retransmit, to the base station, the first random access message based on the set of transmission configuration options and the retransmission trigger.

Some examples of the method, apparatuses, and non-transitory computer-readable medium described herein may further include operations, features, means, or instructions for determining to change at least one transmission configuration parameter from a first transmission of the first random access message to the retransmission of the first random access message based on the set of transmission configuration options.

Some examples of the method, apparatuses, and non-transitory computer-readable medium described herein may further include operations, features, means, or instructions for transmitting, to the base station, a message indicating the determined change to the at least one transmission configuration parameter from the first transmission of the first random access message to the retransmission of the first random access message.

Some examples of the method, apparatuses, and non-transitory computer-readable medium described herein may further include operations, features, means, or instructions for determining a set of transmission configuration states for transmission and retransmission of the first random access message based on the set of transmission configuration options, where each transmission configuration state of the set of transmission configuration states includes a set of transmission configuration parameters, and where each transmission configuration state of the set of transmission configuration states differs by at least one transmission configuration parameter.

Some examples of the method, apparatuses, and non-transitory computer-readable medium described herein may further include operations, features, means, or instructions for selecting a first transmission configuration state from the set of transmission configuration states for a first transmission of the first random access message, transmitting, to the base station, the first transmission of the first random access message according to the first transmission configuration state, and selecting a second transmission configuration state from the set of transmission configuration states for the retransmission of the first random access message, where the retransmission of the first random access message may be transmitted according to the second transmission configuration state, where the second transmission configuration state may be different than the first transmission configuration state.

Some examples of the method, apparatuses, and non-transitory computer-readable medium described herein may further include operations, features, means, or instructions for selecting a first transmission configuration state from the set of transmission configuration states for a first transmission of the first random access message, transmitting, to the base station, the first transmission of the first random access message according to the first transmission configuration state, where the retransmission of the first random access message may be transmitted according to the first transmission configuration state based on a number of retransmissions of the first random access message being below a threshold number of retransmissions, determining to transmit a second retransmission of the first random access message based on the retransmission trigger, selecting a second transmission configuration state from the set of transmission configuration states for the second retransmission, where the second transmission configuration state may be selected based on the number of retransmissions of the first random access message exceeding the threshold number of retransmissions, and transmitting, to the base station, the second retransmission of the first random access message according to the second transmission configuration state based on the determination to transmit the second retransmission, where the second transmission configuration state may be different than the first transmission configuration state.

In some examples of the method, apparatuses, and non-transitory computer-readable medium described herein, the at least one transmission configuration parameter includes a payload size, a modulation and coding scheme (MCS), a multiple-input multiple-output (MIMO) antenna configuration, a carrier, a frequency spectrum, a random access occasion (e.g., RACH occasion) index, a physical uplink channel resource unit (e.g., physical uplink shared channel (PUSCH) resource unit (PRU)) group index, or a combination thereof.

Some examples of the method, apparatuses, and non-transitory computer-readable medium described herein may further include operations, features, means, or instructions for identifying a transition trigger to transition from a first transmission configuration state for a first transmission of the first random access message to a second transmission configuration state for the retransmission of the first random access message, where the retransmission of the first random access message may be transmitted according to the second transmission configuration state based on the transition trigger.

In some examples of the method, apparatuses, and non-transitory computer-readable medium described herein, identifying the transition trigger may include operations, features, means, or instructions for receiving, from the base station, the transition trigger, where the transition trigger includes an indication of a change of system loading information, a change of random access (e.g., RACH) resource allocations, a change in synchronization signal block (SSB) association rules, a change of inter-cell interference measurement, a change of system information, or a combination thereof.

In some examples of the method, apparatuses, and non-transitory computer-readable medium described herein, the transition trigger may be received in radio resource control (RRC) signaling.

In some examples of the method, apparatuses, and non-transitory computer-readable medium described herein, identifying the transition trigger may include operations, features, means, or instructions for determining to transition from the first transmission configuration state to the second transmission configuration state based on a variation of a buffer status for the retransmission from the first transmission, a variation of a power headroom value for the retransmission from the first transmission, a quality of service (QoS) handling for the retransmission, or a combination thereof.

In some examples of the method, apparatuses, and non-transitory computer-readable medium described herein, retransmitting the first random access message further may include operations, features, means, or instructions for transmitting, to the base station, an indication of a log of transmission configuration state transitions for transmitting the first random access message, where the indication of the log of transmission configuration state transitions includes transmission configuration parameters used for transmission of the first random access message prior to the retransmission of the first random access message.

In some examples of the method, apparatuses, and non-transitory computer-readable medium described herein, the indication of the log of transmission configuration state transitions may be indicated via a state-dependent group hopping of preamble and/or sequences, a state-dependent group hopping of demodulation reference signal (DMRS) sequences, a state-dependent hopping of time-frequency resources used by a random access occasion (e.g., RACH occasion), a state-dependent hopping of time-frequency resources used by a physical uplink channel resource unit (e.g., PRU), an uplink control information (UCI) message, an embedded indication in a payload of the first random access message, or a combination thereof.

In some examples of the method, apparatuses, and non-transitory computer-readable medium described herein, the set of transmission configuration options includes an indication of which transmission configuration parameters may be reconfigurable by the UE for the retransmission of the first random access message.

In some examples of the method, apparatuses, and non-transitory computer-readable medium described herein, the transmission configuration parameters include a preamble sequence for a random access occasion (e.g., RACH occasion), an indication of a random access occasion (e.g., RACH occasion), a payload content, a payload size, a physical uplink channel resource unit (e.g., PRU), an MCS, a carrier, a frequency spectrum, a beam, a multi-panel or transmission/reception point (TRP) configuration, a TRP, or a combination thereof.

In some examples of the method, apparatuses, and non-transitory computer-readable medium described herein, the retransmission trigger includes not receiving a fallback random access response message within a random access response window, not receiving a success random access response message within the random access response window, a counter of a number of retransmissions of the first random access message being less than or equal to a threshold number of retransmissions, or a combination thereof.

In some examples of the method, apparatuses, and non-transitory computer-readable medium described herein, the message indicating the set of transmission configuration options includes system information (SI) or RRC signaling.

In some examples of the method, apparatuses, and non-transitory computer-readable medium described herein, the random access procedure includes a two-step random access procedure (e.g., two-step RACH procedure).

A method of wireless communications at a base station is described. The method may include transmitting, to a UE, a message indicating a set of transmission configuration options for retransmitting a first random access message of a random access procedure, receiving, from the UE, a first transmission of the first random access message, and receiving, from the UE, a retransmission of the first random access message based on the set of transmission configuration options and a retransmission trigger.

An apparatus for wireless communications at a base station is described. The apparatus may include a processor, memory coupled with the processor, and instructions stored in the memory. The instructions may be executable by the processor to cause the apparatus to transmit, to a UE, a message indicating a set of transmission configuration options for retransmitting a first random access message of a random access procedure, receive, from the UE, a first transmission of the first random access message, and receive, from the UE, a retransmission of the first random access message based on the set of transmission configuration options and a retransmission trigger.

Another apparatus for wireless communications at a base station is described. The apparatus may include means for transmitting, to a UE, a message indicating a set of transmission configuration options for retransmitting a first random access message of a random access procedure, receiving, from the UE, a first transmission of the first random access message, and receiving, from the UE, a retransmission of the first random access message based on the set of transmission configuration options and a retransmission trigger.

A non-transitory computer-readable medium storing code for wireless communications at a base station is described. The code may include instructions executable by a processor to transmit, to a UE, a message indicating a set of transmission configuration options for retransmitting a first random access message of a random access procedure, receive, from the UE, a first transmission of the first random access message, and receive, from the UE, a retransmission of the first random access message based on the set of transmission configuration options and a retransmission trigger.

Some examples of the method, apparatuses, and non-transitory computer-readable medium described herein may further include operations, features, means, or instructions for determining that at least one transmission configuration parameter for the first transmission of the first random access message may be different than a corresponding transmission configuration parameter for the retransmission of the first random access message based on the set of transmission configuration options.

Some examples of the method, apparatuses, and non-transitory computer-readable medium described herein may further include operations, features, means, or instructions for receiving, from the UE, a message indicating the at least one transmission configuration parameter for the first transmission of the first random access message that may be different than the corresponding transmission configuration parameter for the retransmission of the first random access message.

In some examples of the method, apparatuses, and non-transitory computer-readable medium described herein, the at least one transmission configuration parameter includes a payload size, an MCS, a MIMO antenna configuration (e.g., gain), a carrier, a frequency spectrum, a random access occasion (e.g., RACH occasion) index, a physical uplink channel resource unit (e.g., PRU) group index, or a combination thereof.

In some examples of the method, apparatuses, and non-transitory computer-readable medium described herein, the first transmission of the first random access message may be received according to a first transmission configuration state and the retransmission of the first random access message may be received according to a second transmission configuration state, the second transmission configuration state being different by at least one transmission configuration parameter than the first transmission configuration state.

In some examples of the method, apparatuses, and non-transitory computer-readable medium described herein, the first transmission of the first random access message and the retransmission of the first random access message may be received according to a first transmission configuration state, the retransmission of the first random access message being received according to the first transmission configuration state based on a number of retransmissions of the first random access message being below a threshold number of retransmissions.

Some examples of the method, apparatuses, and non-transitory computer-readable medium described herein may further include operations, features, means, or instructions for receiving, from the UE, a second retransmission of the first random access message according to a second transmission configuration state based on the number of retransmissions of the first random access message exceeding the threshold number of retransmissions, where the second transmission configuration state may be different by at least one transmission configuration parameter than the first transmission configuration state.

Some examples of the method, apparatuses, and non-transitory computer-readable medium described herein may further include operations, features, means, or instructions for transmitting, to the UE, a transition trigger to transition from a first transmission configuration state for the first transmission of the first random access message to a second transmission configuration state for the retransmission of the first random access message, where the transition trigger includes an indication of a change of system loading information, a change of random access (e.g., RACH) resource allocations, a change in SSB association rules, a change of inter-cell interference measurement, a change of system information, or a combination thereof.

In some examples of the method, apparatuses, and non-transitory computer-readable medium described herein, the transition trigger may be transmitted in RRC signaling.

In some examples of the method, apparatuses, and non-transitory computer-readable medium described herein, receiving the retransmission of the first random access message further may include operations, features, means, or instructions for receiving, from the UE, an indication of a log of transmission configuration state transitions the UE used for transmitting the first random access message, where the indication of the log of transmission configuration state transitions includes transmission configuration parameters the UE used for transmission of the first random access message prior to the retransmission of the first random access message.

Some examples of the method, apparatuses, and non-transitory computer-readable medium described herein may further include operations, features, means, or instructions for combining at least a subset of retransmissions of the first random access message based on the indication of the log of transmission configuration state transitions.

In some examples of the method, apparatuses, and non-transitory computer-readable medium described herein, the indication of the log of transmission configuration state transitions may be indicated via a state-dependent group hopping of preamble and/or sequences, a state-dependent group hopping of DMRS sequences, a state-dependent hopping of time-frequency resources used by a random access occasion (e.g., RACH occasion), a state-dependent hopping of time-frequency resources used by a physical uplink channel resource unit (e.g., PRU), a UCI message, an embedded indication in a payload of the first random access message, or a combination thereof.

In some examples of the method, apparatuses, and non-transitory computer-readable medium described herein, the set of transmission configuration options includes an indication of which transmission configuration parameters may be reconfigurable by the UE for the retransmission of the first random access message.

In some examples of the method, apparatuses, and non-transitory computer-readable medium described herein, the transmission configuration parameters include a preamble sequence for a random access occasion (e.g., RACH occasion), an indication of a random access occasion (e.g., RACH occasion), a payload content, a payload size, a physical uplink channel resource unit (e.g., PRU), an MCS, a carrier, a frequency spectrum, a beam, a multi-panel or TRP configuration, a TRP, or a combination thereof.

In some examples of the method, apparatuses, and non-transitory computer-readable medium described herein, the message indicating the set of transmission configuration options includes SI or RRC signaling.

In some examples of the method, apparatuses, and non-transitory computer-readable medium described herein, the random access procedure includes a two-step random access procedure (e.g., two-step RACH).

DETAILED DESCRIPTION

Figure 1:
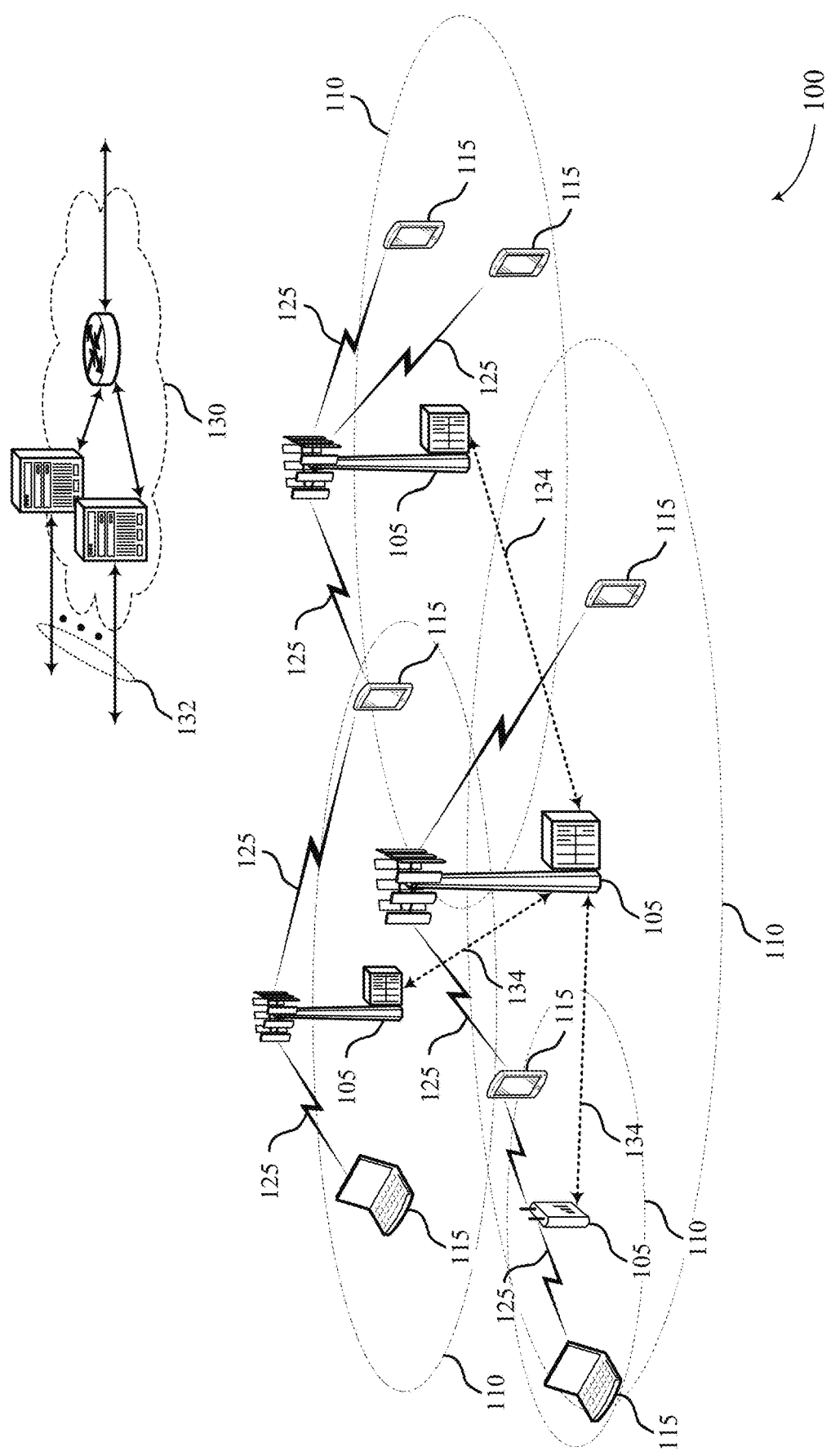
FIG. 1 illustrates an example of a system for wireless communications that supports adaptive retransmission for a random access (e.g., RACH) procedure in accordance with aspects of the present disclosure.

In some network deployment scenarios, a base station and a UE may simultaneously use different random access procedures to meet different requirements for the system. For example, the different random access procedures may include two-step RACH procedures and four-step RACH procedures, and the different requirements may include capacity limitations, latency requirements, reliability requirements, implementation complexity specifications, etc. Accordingly, different transmission occasions may be defined that can be used for both or either RACH procedure. For example, the different transmission occasions may include RACH occasions and uplink shared channel (e.g., PUSCH) occasions. In some cases, the UE may transmit a first message of a two-step RACH procedure in the RACH occasions and the uplink shared channel occasions, where a preamble of the first message is transmitted in a RACH occasion and a payload of the first message is transmitted in an uplink shared channel occasion. Additionally, the payload of the first message may further include a demodulation reference signal (DMRS) transmission and uplink shared data (e.g., transmitted in a PUSCH).

However, because of channel impairment (e.g., fading, interference, etc.) and/or the two-step RACH procedure (e.g., and four-step RACH procedure) being a contention-based multiple access procedure where multiple UEs may be transmitting at a same time, the transmission of the first message of the two-step RACH procedure (e.g., the preamble and/or payload) may fail (e.g., the base station may not be able to decode the message). Accordingly, as described herein, the UE may support retransmitting the first message of the two-step RACH procedure based on the failure of a previous transmission of the first message. Additionally, to improve performance of transmitting/retransmitting the first message and improve the probability that the two-step RACH procedure is successful, the UE may reconfigure the first message (e.g., change one or more transmission parameters from a previous first message transmission) for the retransmission.

For example, the base station may transmit a set of transmission configuration options that indicate one or more transmission parameters the UE can change for the retransmission of the first message. Accordingly, if the UE determines to retransmit the first message (e.g., based on a retransmission trigger), the UE may further determine to change one or more transmission parameters from a preceding transmission of the first message to this retransmission based on the set of transmission configuration options. In some cases, the UE may indicate which transmission parameters were changed for the retransmission of the first message to the base station (e.g., implicitly or explicitly).

Additionally, the UE may configure a set of transmission configuration states based on the transmission configuration options transmitted by the base station for transmissions/retransmission of the first message of the two-step RACH procedure. For example, a first transmission of the first message and any subsequent retransmissions may use a same or different transmission configuration state, where each transmission configuration state has at least one different transmission parameter from the other transmission configuration states. In some cases, the UE may determine to switch transmission configuration states based on a trigger signaled by the base station and/or a determination by the UE. Additionally, the UE may transmit an indication of a log of state transitions performed prior to a retransmission of the first message (e.g., transmission parameters used by preceding transmissions of the first message before the retransmission). Accordingly, the base station may use the log of state transitions to combine at least a subset of the transmissions and retransmissions of the first message (e.g., as part of an interference cancellation).

Aspects of the disclosure are initially described in the context of a wireless communications system. Additionally, aspects of the disclosure are illustrated through an additional wireless communications system, a transmission configuration state transition, a two-step RACH procedure, a first RACH message (e.g., msgA) transmission, and a process flow. Aspects of the disclosure are further illustrated by and described with reference to apparatus diagrams, system diagrams, and flowcharts that relate to adaptive retransmission for a RACH procedure.

FIG. 1 illustrates an example of a wireless communications system 100 that supports adaptive retransmission for a RACH procedure in accordance with aspects of the present disclosure. The wireless communications system 100 includes base stations 105, UEs 115, and a core network 130. In some examples, the wireless communications system 100 may be an LTE network, an LTE-A network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a base station 105 may transmit synchronization signals (e.g., PSS SSS, and the like) using multiple beams in a beam-sweeping manner through a cell coverage area. In some cases, PSS, SSS, and/or broadcast information (e.g., a physical broadcast channel (PBCH)) may be transmitted within different synchronization signal (SS) blocks on respective directional beams, where one or more SS blocks may be included within an SS burst.

After receiving the PSS and SSS, the UE 115 may receive a master information block (MIB), which may be transmitted in the PBCH. The MIB may contain system bandwidth information, an SFN, and a physical HARQ indicator channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain RRC configuration information related to RACH procedures, paging, PUCCH, PUSCH, power control, SRS, and cell barring.

After completing initial cell synchronization, a UE 115 may decode the MIB, SIB1 and SIB2 prior to accessing the network. The MIB may be transmitted on PBCH and may utilize the first 4 OFDMA symbols of the second slot of the first subframe of each radio frame. It may use the middle 6 RBs (72 subcarriers) in the frequency domain. The MIB carries a few important pieces of information for UE initial access, including: downlink channel bandwidth in term of RBs, PHICH configuration (duration and resource assignment), and SFN. A new MIB may be broadcast every fourth radio frame (SFN mod 4=0) at and rebroadcast every frame (10 ms). Each repetition is scrambled with a different scrambling code.

After reading a MIB (either a new version or a copy), the UE 115 may try different phases of a scrambling code until it gets a successful CRC check. The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase. After receiving the MIB, a UE may receive one or more SIBs. Different SIBs may be defined according to the type of system information conveyed. A new SIB1 may be transmitted in the fifth subframe of every eighth frame (SFN mod 8=0) and rebroadcast every other frame (20 ms). SIB1 includes access information, including cell identity information, and it may indicate whether a UE is allowed to camp on a cell. SIB1 also includes cell selection information (or cell selection parameters). Additionally, SIB1 includes scheduling information for other SIBs. SIB2 may be scheduled dynamically according to information in SIB1, and includes access information and parameters related to common and shared channels. The periodicity of SIB2 can be set to 8, 16, 32, 64, 128, 256 or 512 radio frames.

After the UE 115 decodes SIB2, it may transmit a RACH preamble (e.g., a message 1 (Msg1) in a four-step RACH procedure) to a base station 105. For example, the RACH preamble may be randomly selected from a set of 64 predetermined sequences. This random selection may enable the base station 105 to distinguish between multiple UEs 115 trying to access the system simultaneously. The base station 105 may respond with a random access response (e.g., a second message (Msg2)) that provides an uplink resource grant, a timing advance, and a temporary cell radio network temporary identifier (C-RNTI). The UE 115 may then transmit an RRC connection request (e.g., a third message (Msg3)) along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message (e.g., a fourth message (Msg4)) addressed to the UE 115, which may provide a new C-RNTI. If the UE 115 receives a contention resolution message with the correct identification, the UE 115 may proceed with RRC setup. If the UE 115 does not receive a contention resolution message (e.g., if there is a conflict with another UE 115) it may repeat the RACH procedure by transmitting a new RACH preamble. Such exchange of messages between the UE 115 and base station 105 for random access may be referred to as a four-step RACH procedure.

In other examples, a two-step RACH procedure may be performed for random access. For instance, wireless devices operating in licensed or unlicensed spectrum within wireless communications system 100 may initiate a two-step RACH procedure to reduce delay in establishing communication with a base station 105 (e.g., as compared to a four-step RACH procedure). In some cases, the two-step RACH procedure may operate regardless of whether a wireless device (e.g., a UE 115) has a valid timing advance (TA). For example, a UE 115 may use a valid TA to coordinate the timing of its transmissions to a base station 105 (e.g., to account for propagation delay) and may receive the valid TA as part of the two-step RACH procedure. Additionally, the two-step RACH procedure may be applicable to any cell size, may work regardless of whether the RACH procedure is contention-based or contention-free, and may combine multiple RACH messages from a four-step RACH procedure. For example, the two-step RACH procedure may include a first message (e.g., a message A (msgA)) that combines the Msg1 and Msg3 of the four-step RACH procedure and a second message (e.g., a message B (msgB)) that combines the Msg2 and Msg4 of the four-step RACH procedure.

The two-step RACH procedure may be applicable to any cell size supported in a wireless communications system, be able to operate regardless of if a UE 115 has a valid TA or not, and may be applied to any RRC state of the UE 115 (e.g., an idle state (RRC_IDLE), an inactive state (RRC_INACTIVE), a connected state (RRC_CONNECTED), etc.). In some cases, the two-step RACH procedure may result in a reduction in signaling overhead and latency, an enhanced RACH capacity, power savings for the UE 115, and provide synergy with other applications (e.g., positioning, mobility enhancement, etc.). Additionally, the two-step RACH procedure may include improvements in RACH capacity and power efficiency over a four-step RACH procedure.

As part of the two-step RACH procedure, the UE 115 may transmit a first message (e.g., msgA) in one or more configured RACH occasions and one or more uplink shared channel occasions (e.g., PUSCH occasions), where a preamble of the first message is transmitted in a RACH occasion and a payload of the first message is transmitted in an uplink shared channel occasion (e.g., on a PRU). Additionally, the payload of the first message may further include a DMRS transmission and uplink shared data transmission (e.g., transmitted in a PUSCH). In some cases, the UE 115 may select a preamble to transmit from 64 available preambles per RACH occasion. Additionally, the base station 105 may configure the UE 115 to transmit eight (8) DMRS ports per uplink shared channel occasion (e.g., or may be 4, 6, or 12 DMRS ports). In some cases, a mapping may exist between the preamble and the DMRS ports. For example, a one-to-one mapping may exist such that one (1) RACH occasion maps to eight (8) uplink shared channel occasions. Accordingly, the 64 available preambles may be mapped to respective DMRS ports in each of the eight (8) uplink shared channel occasions with eight (8) DMRS ports each.

To support various payload sizes and cell coverage requirements, the first message transmission of the two-step RACH procedure (e.g., msgA transmission) may support a configurable MCS (e.g., code rate) and a configurable transport block size (TBS) (e.g., size of payload portion of the first message). For example, a UE 115 may support different configurations for transmitting the first message, where the configuration for the first message may be indicated by a base station 105 prior to beginning the two-step RACH procedure. However, because of channel impairments as well as the two-step RACH procedure being a contention-based multiple access procedure, the transmission of the first message preamble and/or payload may fail. That is, multiple UEs 115 may contend for a set of shared resources (e.g., shared spectrum of frequency resources) for transmitting messages to one or more base stations 105 such that a first message transmission from a UE 115 for a two-step RACH procedure may interfere with a transmission from a separate UE 115 on the same set of shared resources, impacting the chances the first message transmission of the two-step RACH procedure being received successfully at the corresponding base station 105.

Additionally, even if the base station 105 can successfully detect and receive the first message preamble/payload for the two-step RACH procedure, the transmission of the second message of the two-step RACH procedure (e.g., msgB transmission) may fail based on channel impairments as well (e.g., such as fading, interference, etc.). In some cases, if the base station 105 is unable to detect the first message or unable to successfully transmit the second message, the UE 115 may determine to retransmit the first message to reattempt the two-step RACH procedure. Accordingly, a retransmission of the first message may be supported in two-step RACH procedures, where the retransmission is still contention-based (e.g., transmitted on shared resources) and may still include a preamble portion and a payload portion. In conventional systems, the UE 115 may use a same configuration initially signaled by the base station 105 (e.g., for an initial transmission of the first message) to retransmit the first message. However, using the same configuration may result in the same issues that caused a first transmission (e.g., or previous transmission) of the first message to fail, thereby causing the retransmission of the first message to fail as well. Accordingly, efficient techniques may be desired to utilize the different configurable parameters (e.g., different transmission parameters) a UE 115 may use for transmitting the first message of the two-step RACH procedure.

Wireless communications system 100 may support efficient techniques for an adaptive retransmission of a first message of a two-step RACH procedure to improve performance of the first message retransmission (e.g., increase chances the first message is successfully detected by a base station 105). For example, the UE 115 may reconfigure the first message (e.g., change one or more transmission parameters from a previous first message transmission) for the retransmission. In some cases, the base station 105 may transmit a set of transmission configuration options that indicate one or more transmission parameters the UE 115 can change for the retransmission of the first message. Accordingly, if the UE 115 determines to retransmit the first message (e.g., based on a retransmission trigger), the UE 115 may further determine to change one or more transmission parameters from a preceding transmission of the first message to this retransmission based on the set of transmission configuration options. In some cases, the UE 115 may indicate which transmission parameters were changed for the retransmission of the first message to the base station 105 (e.g., implicitly or explicitly).

Additionally, the UE 115 may configure a set of transmission configuration states based on the transmission configuration options transmitted by the base station 105 for transmissions/retransmissions of the first message of the two-step RACH procedure. For example, a first transmission of the first message and any subsequent retransmissions may use a same or different transmission configuration state, where each transmission configuration state has at least one different transmission parameter from the other transmission configuration states. In some cases, the UE 115 may determine to switch transmission configuration states based on a trigger signaled by the base station 105 and/or a determination by the UE 115. Additionally, the UE 115 may transmit an indication of a log of state transitions performed prior to a retransmission of the first message (e.g., transmission parameters used by preceding transmissions of the first message before the retransmission) when retransmitting the first message. Accordingly, the base station 105 may use the log of state transitions to combine at least a subset of the transmissions and retransmissions of the first message (e.g., as part of an interference cancellation).

Figure 2:
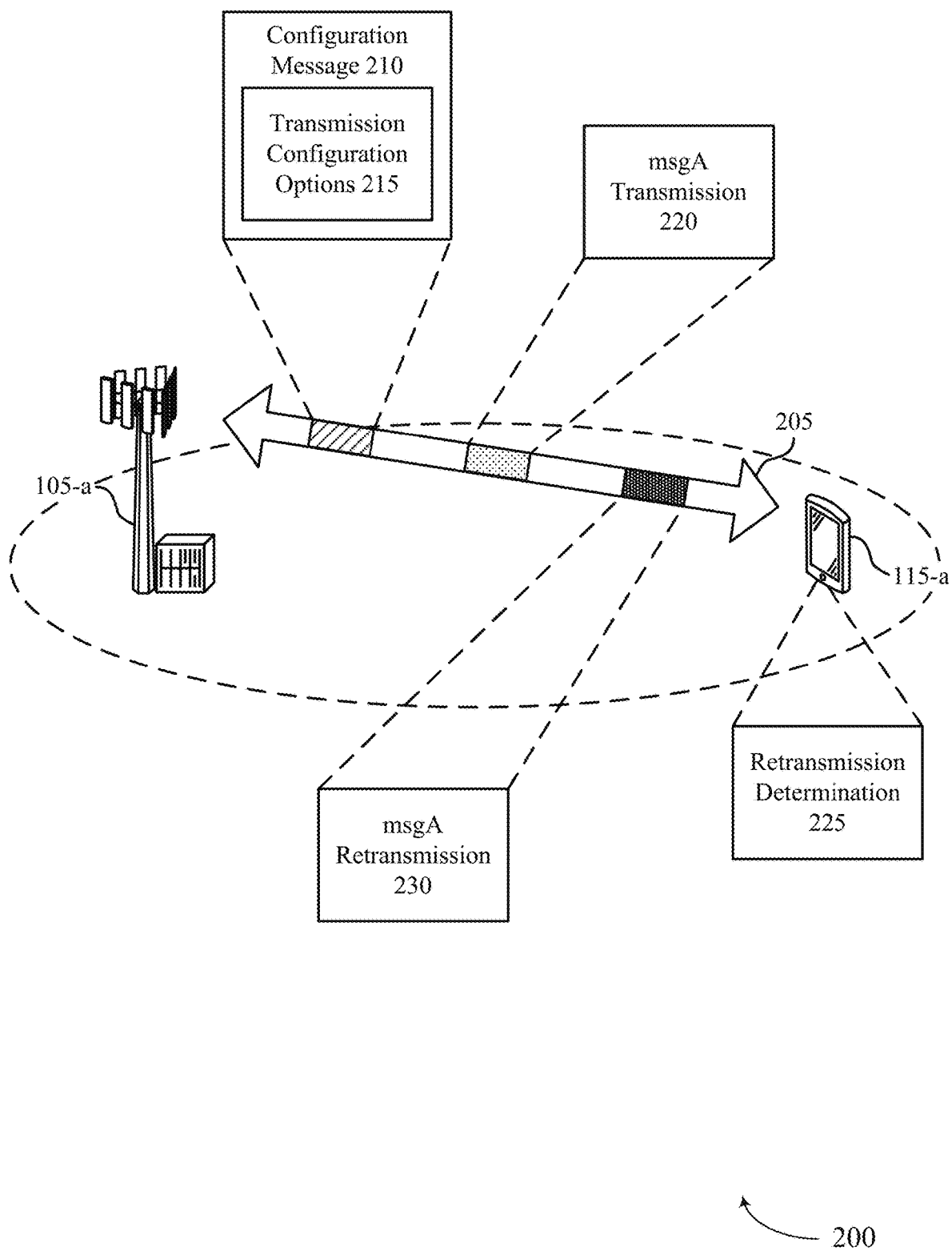
FIG. 2 illustrates an example of a wireless communication system that supports adaptive retransmission for a RACH procedure in accordance with aspects of the present disclosure.

FIG. 2 illustrates an example of a wireless communications system 200 that supports adaptive retransmission for a RACH procedure in accordance with aspects of the present disclosure. In some examples, wireless communications system 200 may implement aspects of wireless communications system 100. Wireless communications system 200 may include a base station 105-*a* and a UE 115-*a*, which may be examples of corresponding base stations 105 and UEs 115, respectively, as described above with reference to FIG. 1. In some cases, base station 105-*a* and UE 115-*a* may communicate on resources of a carrier 205. For example, base station 105-*a* and UE 115-*a* may perform a two-step RACH procedure to establish a connection (e.g., or a reconnection, handover, etc.) for the communications.

Initially, base station 105-*a* may transmit a configuration message 210 to UE 115-*a* (e.g., via RRC signaling, broadcast signaling such as system information block (SIB), etc.), which includes configuration information for UE 115-*a* to begin the two-step RACH procedure. For example, configuration message 210 may include a resource allocation on carrier 205 along with one or more parameters for UE 115-*a* to use for transmitting a first random access message of the two-step RACH procedure. In some cases, this first random access message may be referred to as a msgA transmission 220. Additionally, msgA transmission 220 may include a preamble portion and a payload portion, where configuration message 210 includes transmission occasions that UE 115-*a* can use for transmitting the respective portions. For example, configuration message 210 may indicate one or more RACH occasions (e.g., or PRACH occasions) for transmitting the preamble portion and one or more PUSCH occasions for transmitting the payload portion (e.g., on PRUs). In some cases, the one or more RACH occasions as well as the one or more PUSCH occasions may be separated in the code domain (e.g., based on a CDMA scheme). Additionally, UE 115-*a* may support configurable parameters for msgA transmission 220 to support various payload size and cell coverage, where the configurable parameters are indicated in configuration message 210.

However, as described above in FIG. 1, the transmission of the preamble and/or payload for msgA transmission 220 may fail. For example, UE 115-*a* may determine that msgA transmission 220 has failed based on a retransmission trigger as part of a retransmission determination 225. In some cases, the retransmission trigger may include UE 115-*a* determining that no fallback random access response message (e.g., indicating the preamble portion was received successfully but not the payload portion) or success random access response message (e.g., indicating both the preamble portion and payload portion were successfully received and decoded by base station 105-*a*) is received within a random access response window (e.g., pre-configured random access response window as indicated by base station 105-*a*, such as in configuration message 210, RRC signaling, SI messages, etc.). Accordingly, if UE 115-*a* does not receive the fallback or success random access response message before the random access response window elapses, UE 115-*a* may determine that msgA transmission 220 failed (e.g., due to channel impairments and/or the contention-based multiple access nature of the two-step RACH procedure) or that a second message of the two-step RACH procedure (e.g., a msgB transmission) has failed. Additionally or alternatively, the retransmission trigger may include UE 115-*a* determining whether a number of msgA transmissions (e.g., including retransmissions) is less than or equal to a configured threshold number of msgA transmissions (e.g., configured threshold of retransmissions, such as indicated by a Network_Configured_Threshold_ReTX parameter), where the configured threshold is indicated by base station 105-*a* (e.g., in configuration message 210).

Based on the retransmission trigger, UE 115-*a* may determine to retransmit msgA (e.g., as long as the counter of msgA transmissions is below the configured threshold) during retransmission determination 225. Rather than using the same configuration for msgA transmission 220, UE 115-*a* may further use retransmission determination 225 to reconfigure msgA as part of a msgA adaptive retransmission technique to improve the performance of a msgA retransmission 230 (e.g., increase chances that msgA does not fail). To enable or assist UE 115-*a* with the reconfiguration for msgA retransmission 230, base station 105-*a* may transmit a set of transmission configuration options 215 (e.g., with configuration message 210, in SI messaging, RRC signaling, or a combination thereof). Accordingly, msgA retransmission 230 may include a reconfigured preamble and/or payload, where the preamble/payload configurations may be different from a last transmission of msgA (e.g., msgA transmission 220) from UE 115-*a* (e.g., a same UE 115). In some cases, msgA retransmission 230 may include a change in content from msgA transmission 220 and/or a change in one or more transmission parameters (e.g., a configuration) of msgA transmission 220.

Transmission configuration options 215 may indicate one or more transmission parameters that UE 115-a can change from msgA transmission 220 to msgA retransmission 230 (e.g., or from msgA retransmission 230 to a subsequent retransmission). For example, the one or more transmission parameters that UE 115-a can change for a reconfiguration of msgA may include different preamble sequences (e.g., for a same RACH occasion), different RACH occasions to use, different payload contents, different payload size, different PRUs (e.g., for the payload portion transmission), different MCS, switching of carriers/spectrum (e.g., from a first frequency range (FR1) to a second frequency range (FR2), from a licensed spectrum to a shared/unlicensed spectrum, etc.), switching of a beam, switching of a TRP, or a combination thereof.

Accordingly, when UE 115-a decides to retransmit msgA (e.g., as part of retransmission determination 225), UE 115-a may also decide whether or not to change one or more transmission parameters based on transmission configuration options 215. Additionally, for a contention-based retransmission of msgA retransmission 230, UE 115-a may indicate if one of the transmission parameters has changed for msgA retransmission 230 to base station 105-a implicitly and/or explicitly. For example, the implicit indication may include a relationship between different transmission parameters to signal the change in transmission parameters (e.g., different RACH occasions, PRUs, preamble or DMRS sequences, etc. may correspond to different MCSs, payload sizes, TBSs, etc., where base station 105-a may determine the new MCS, payload size, TBS, etc. based on the used RACH occasion, PRU, preamble or DMRS sequence, etc.). Additionally or alternatively, the explicit indication may include a specific indication that UE 115-a transmits to base station 105-a indicating which transmission parameters were changed for msgA retransmission 230 (e.g., included in UCI, with msgA retransmission 230, etc.).

In some cases, base station 105-a may broadcast information for two-step RACH resource configurations (e.g., in configuration message 210) as well as supported transmission parameters (e.g., time/frequency resources, range of payload size, range of MCS, power control parameters, Network_Configured_Threshold_ReTX, etc.) for a msgA transmission 220 and/or msgA retransmission 230 (e.g., in transmission configuration options 215). Based on transmission configuration options 215 (e.g., configuration options) broadcast by base station 105-a, UE 115-a may quantize multiple configurations for msgA transmission 220/msgA retransmission 230 into multiple transmission configuration states. Each transmission configuration state ($S_j$) may be characterized by one or multiple transmission parameters (e.g., each transmission configuration state differs by at least one transmission parameter). For example, the one or multiple transmission parameters that characterize each transmission configuration state may include a payload size, MCS, MIMO gain (e.g., if multi-beam/TRP is supported), carrier/spectrum, RACH occasion index, PRU group index, etc.

After configuring the different transmission configuration states, UE 115-a may select a first transmission configuration state (e.g., $S_{T(0)}$) for a first transmission of msgA (e.g., msgA transmission 220). If the first transmission of msgA fails, UE 115-a may select a second transmission configuration state (e.g., $S_{T(1)}$) for a retransmission of msgA (e.g., msgA retransmission 230). Subsequently, if the retransmission of msgA associated with the second transmission configuration state also fails, UE 115-a may then select a third transmission configuration state (e.g., $S_{T(2)}$) for a second retransmission of msgA. In some cases, state transitions may occur in adjacent retransmissions (e.g., $S_{T(k+1)} \neq S_{T(k)}$, such that adjacent retransmissions of msgA use different transmission configuration states) or may take place after more than one retransmission in a same transmission configuration state (e.g., $S_{T(k+2)} \neq S_{T(k+1)}$ and $S_{T(k+1)} = S_{T(k)}$). For example, UE 115-a may decrease a TBS (e.g., payload size), descend an MCS level, switch transmit beams to a beam with a higher beamforming gain, or a combination thereof when transitioning from a first transmission configuration state to a second transmission configuration state.

In some cases, UE 115-a may determine to transition between transmission configuration states (e.g., for adaptive retransmission of msgA) based on a transition trigger. For example, base station 105-a (e.g., or another network node) may indicate the transition trigger (e.g., trigger of state transition) to UE 115-a (e.g., via RRC signaling). Between msgA transmission 220 and msgA retransmission 230 (e.g., or between two retransmissions of msgA), UE 115-a may receive downlink information from base station 105-a that indicates the transition trigger. The transition trigger indication from base station 105-a may include a change of system loading information, a change of RACH resource allocations and/or SSB association rules, a change of inter-cell interference measurements, other changes of system information, etc. Accordingly, UE 115-a may transition from a first transmission configuration state to a second transmission configuration state based on identifying one of the above described changes. Additionally or alternatively, UE 115-a may identify transition trigger autonomously without signaling from base station 105-a. For example, UE 115-a may determine to transition from a first transmission configuration state to a second transmission configuration state based on a variation of buffer status for a retransmission of msgA, a variation of power headroom for the retransmission of msgA, a QoS handling for a retransmission, etc.

Additionally, UE 115-a may transmit an indication of a state transition to base station 105-a when transmitting msgA retransmission 230. For example, UE 115-a may indicate a log of state transitions, where the log of state transitions includes transmission parameters used by preceding transmissions of msgA (e.g., no indication of state transitions for future transmissions/retransmissions of msgA). In some cases, UE 115-a may indicate the state transitions by a state-dependent group hopping of preamble and/or DMRS sequences for the previous msgA transmissions/retransmissions, a state dependent hopping of time/frequency resources used by a RACH occasion and/or PRU for the previous msgA transmissions/retransmissions, UCI (e.g., including information about the state transition), embedded in a payload portion of msgA or a combination thereof.

Accordingly, base station 105-a may use the indication of state transitions to facilitate combining of the msgA transmission and retransmissions by leveraging the log of state transitions for a coherent or non-coherent combining. For the combining of the msgA retransmissions, depending on the state transitions of adaptive retransmissions, base station 105-a may employ chase combining and/or incremental redundancy (IR) to combine at least a subset of msgA retransmissions. In some cases, base station 105-a may perform the combining of msgA retransmissions in conjunction with successive interference cancellation. By combining msgA transmission 220, msgA retransmission 230, and any additional msgA retransmissions, base station 105-a may improve chances of successfully receiving and decoding msgA and, thereby, may improve chances of completing the two-step RACH procedure.

Figure 3:
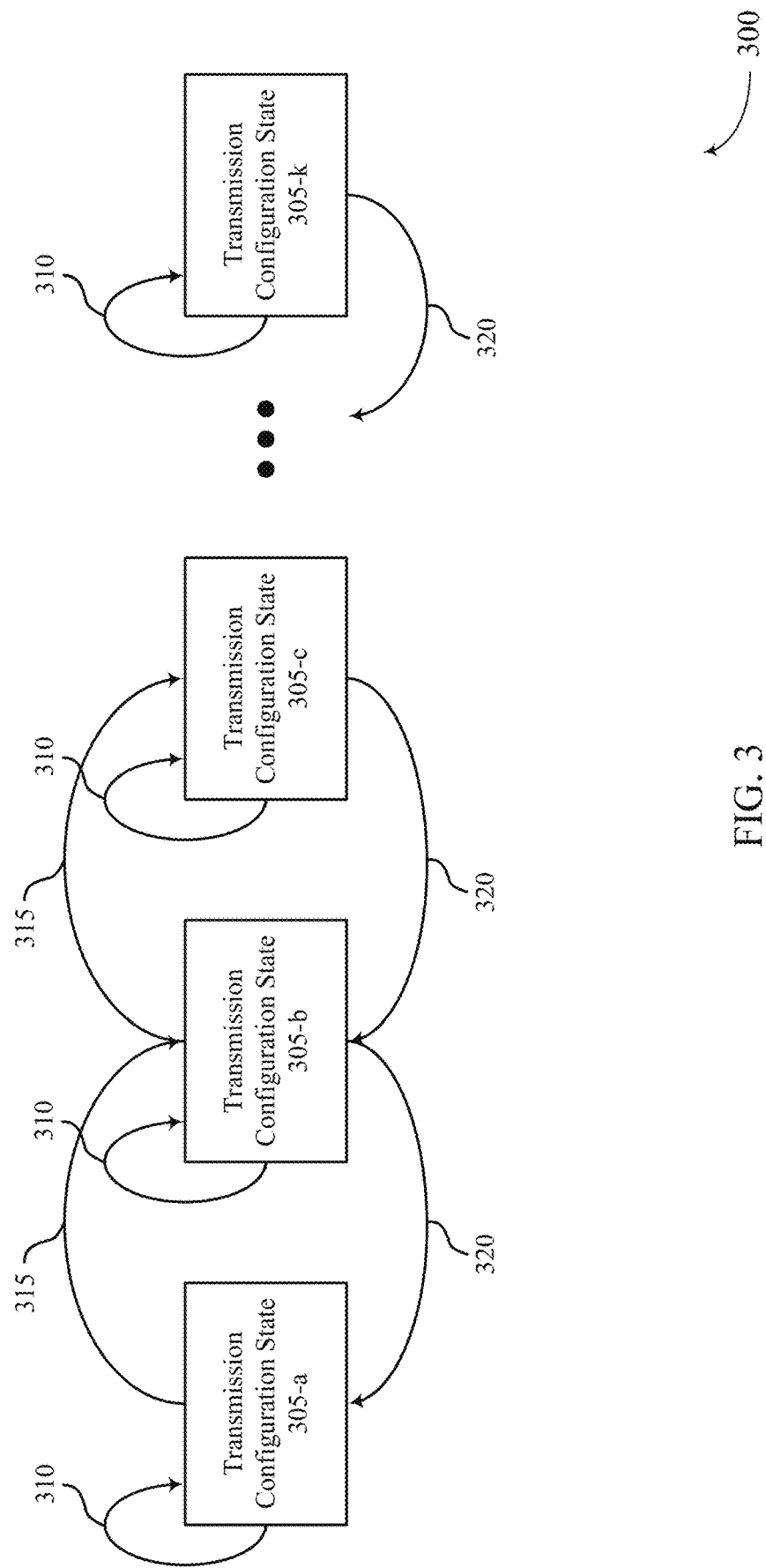
FIG. 3 illustrates an example of a transmission configuration state transition that supports adaptive retransmission for a RACH procedure in accordance with aspects of the present disclosure.

FIG. 3 illustrates an example of a transmission configuration state transition 300 that supports adaptive retransmission for a RACH procedure in accordance with aspects of the present disclosure. In some examples, transmission configuration state transition 300 may implement aspects of wireless communications systems 100 and/or 200. As described herein, a UE 115 and a base station 105 may perform a two-step RACH procedure to establish a connection for subsequent communications between the UE 115 and the base station 105. In some cases, a first random access message of the two-step RACH procedure (e.g., a msgA) may fail as described above, leading to the UE 115 to determine to retransmit the first random access message. However, the UE 115 may determine to reconfigure the first random access message according to a set of transmission configuration options (e.g., transmission parameters that can be changed by the UE 115) to improve performance of the first random access message transmission.

In some cases, the UE 115 may determine one or more transmission configuration states 305 (e.g., up to k transmission configuration states) based on the set of transmission configuration options and use a transmission configuration state 305 to transmit and/or retransmit the first random access message, where each transmission configuration state 305 differs by at least one transmission parameter. For example, the UE 115 may use a first transmission configuration state 305-a for an initial transmission of the first random access message. In some cases, the UE 115 may use the first transmission configuration state 305-a for multiple transmissions/retransmissions of the first random access message until a threshold number of retransmissions has been reached (e.g., two (2) retransmissions, three (3) retransmission, etc.). For example, the UE 115 may use a state persistence 310 for one or more transmissions/retransmissions of the first random access message.

Additionally or alternatively, the UE 115 may determine to perform a state transition 315 or 320 for a retransmission of the first random access message. For example, the retransmission of the first random access message may use a second transmission configuration state 305-b, a third transmission configuration state 305-c, etc. up to a k-th transmission configuration state 305-k. As an example, the second transmission configuration state 305-b may include a decreased TBS than the first transmission configuration state 305-a, the third transmission configuration state 305-c may include a lower MCS level than the first transmission configuration state 305-a and/or the second transmission configuration state 305-b, the transmission configuration state 305-k may include a different transmit beam than the other transmission configuration states 305, etc. A state transition 320 may include a previously used transmission configuration state 305 prior to a currently used transmission configuration state 305 for a first random access message retransmission, whereas a state transition 315 may include a next configured transmission configuration state 305 determined by the UE 115.

Accordingly, as described above, the UE 115 may determine to perform a state transition 315 or 320 based on a transition trigger indicated by the base station 105 or determined autonomously by the UE 115. Additionally, if the UE 115 does perform a state transition 315 or 320 for a first random access message transmission, the UE 115 may indicate this state transition and any previous state transitions in a log to the base station 105. Based on the log of state transitions, the base station 105 may combine at least a subset of the retransmissions of the first random access message transmission.

Figure 4:
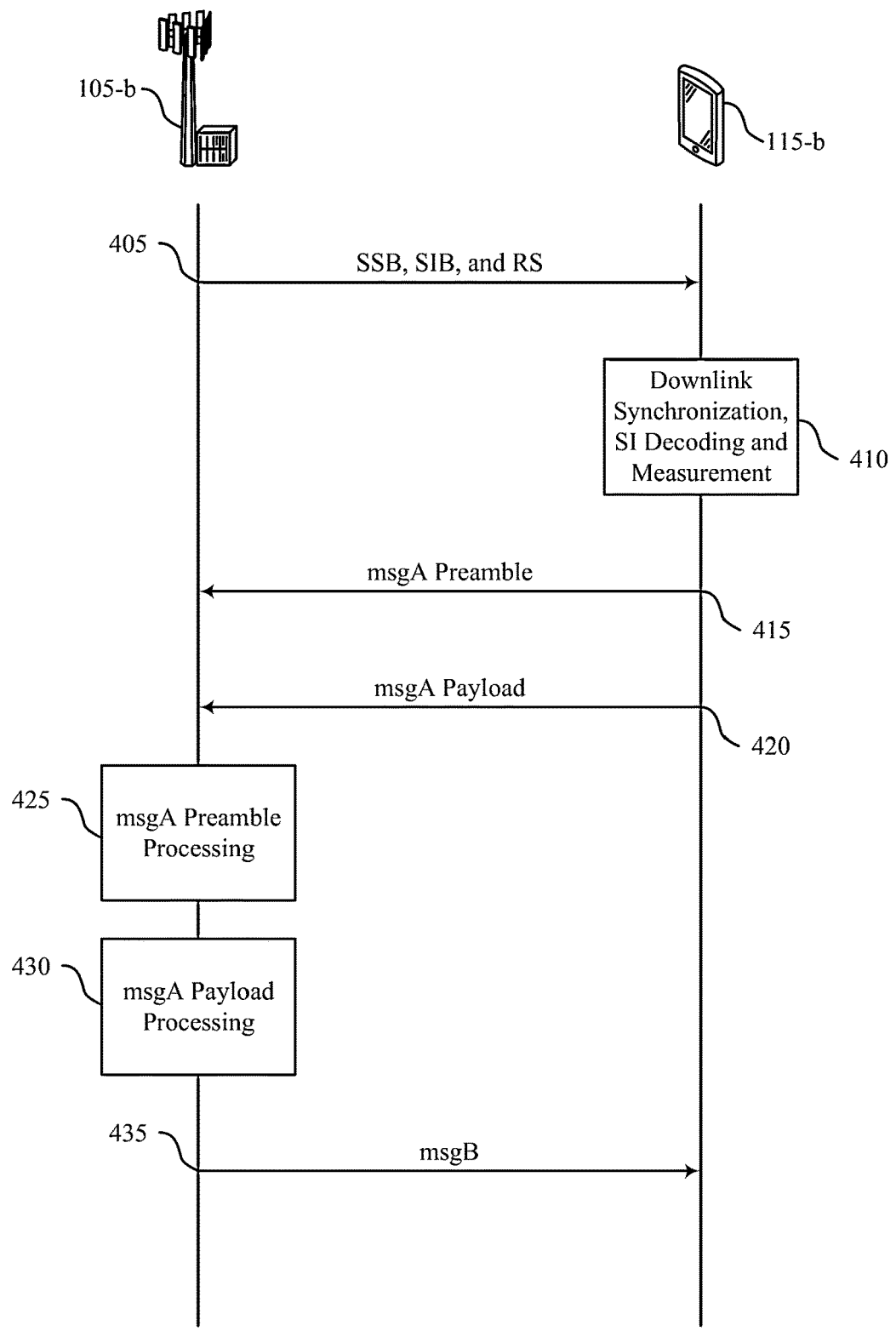
FIG. 4 illustrates an example of a two-step RACH procedure that supports adaptive retransmission in accordance with aspects of the present disclosure.

FIG. 4 illustrates an example of a two-step RACH procedure 400 that supports adaptive retransmission in accordance with aspects of the present disclosure. In some examples, two-step RACH procedure 400 may implement aspects of wireless communications systems 100 and/or 200. Two-step RACH procedure 400 may include a base station 105-b and a UE 115-b, which may be examples of corresponding base stations 105 and UEs 115, respectively, as described above with reference to FIGS. 1-3. Additionally, two-step RACH procedure 400 may illustrate a two-step RACH procedure as described herein for UE 115-b to establish a connection with base station 105-b for subsequent communications.

At 405, base station 105-b may transmit a SSB, system information block (SIB), reference signal (RS), or a combination thereof to indicate configuration information to UE 115-b for performing the two-step RACH procedure. At 410, UE 115-b may perform a downlink synchronization based on the received SSB to synchronize with base station 105-b prior to beginning the two-step RACH procedure. Additionally, UE 115-b may decode and measure any SI transmissions received from base station 105-b (e.g., SIB, RS, etc.) to identify configuration information for transmitting a first message of the two-step RACH procedure (e.g., a msgA, a first random access message, etc.). For example, by decoding and measuring the SI, UE 115-b may identify a periodicity for transmitting different portions of the first message.

At 415, UE 115-b may transmit, to base station 105-b, a preamble of the first message (e.g., msgA preamble) of the two-step RACH procedure. As described herein, UE 115-b may transmit the preamble in one or more RACH occasions configured to carry the preamble by base station 105-b. Additionally, at 420, UE 115-b may transmit, to base station 105-b, a payload of the first message (e.g., msgA payload), where the payload is transmitted in one or more PUSCH occasions associated with the RACH occasion as described herein. Accordingly, the preamble of the first message may include a physical RACH (PRACH) transmission, and the payload of the first message may include a DMRS/PUSCH transmission. Additionally, the first message may include an equivalent of a third message for a four-step RACH procedure, uplink data, a MAC control element (MAC CE), a UCI piggyback transmission, or a combination thereof.

At 425, base station 105-b may process the preamble of the first message. Accordingly, if the preamble is detected and intended for base station 105-b from UE 115-b, at 530, base station 105-b may then process the payload of the first message.

Based on correctly receiving and processing both portions of the first message, at 435, base station 105-b may then transmit a second message (e.g., msgB) of the two-step RACH procedure to UE 115-b. In some cases, the second message transmission may include a physical downlink control channel (PDCCH) transmission and a physical downlink shared channel (PDSCH) transmission. Accordingly, the second message may include transmissions on a DMRS/PDCCH and/or a DMRS/PDSCH. Additionally, the second message may constitute an equivalent of a combination of a second message and a fourth message of a four-step RACH procedure.

Subsequently, if UE 115-b correctly receives the second message (e.g., with no interference or is able to decode the message with any interference), the two-step RACH procedure may be complete, and UE 115-*b* and base station 105-*b* may communicate based on the successful RACH procedure.

In some cases, as described herein, the preamble and/or payload of the first message may fail, leading to UE 115-*b* to attempt a retransmission of the first message. Since UE 115-*b* can support configurable transmission parameters for transmitting the first message as described above, UE 115-*b* may determine to reconfigure the preamble and/or payload of the first message for the retransmission. Accordingly, base station 105-*b* may transmit a set of transmission configuration options that indicate which transmission parameters UE 115-*b* can change for the retransmission.

Figure 5:
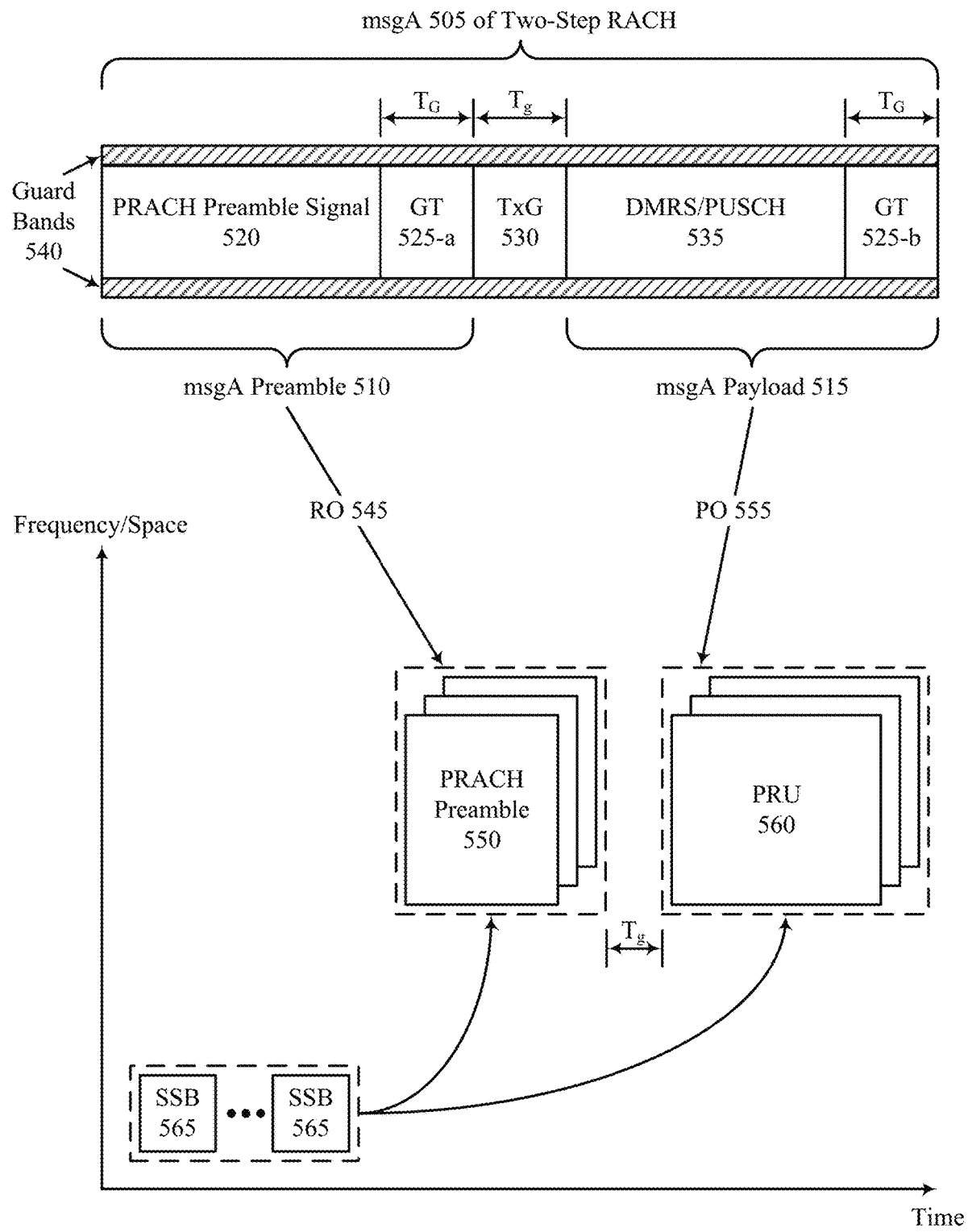
FIG. 5 illustrates an example of a first RACH message transmission that supports adaptive retransmission for a RACH procedure in accordance with aspects of the present disclosure.

FIG. 5 illustrates an example of a msgA transmission 500 that supports adaptive retransmission for a RACH procedure in accordance with aspects of the present disclosure. In some examples, msgA transmission 500 may implement aspects of wireless communications systems 100 and/or 200. In some cases, msgA transmission 500 may represent the structure of a first message (e.g., msgA) 505 for a two-step RACH procedure as described herein. Accordingly, in some cases, a UE 115 may transmit first message 505 to a base station 105 according to a channel structure as shown. The channel structure of the first message 505 may support a contention-based random access (CBRA) (e.g., RACH) procedure on shared time-frequency-code resources In some cases, first message 505 may include a preamble 510 and a payload 515 as described above, where transmission bandwidths for the preamble 510 and the payload 515 may be the same or different (e.g., as described above with reference to FIGS. 2 and 3). The preamble 510 may include a PRACH preamble signal 520, where the preamble 510 (e.g., with PRACH preamble signal 520) serves multiple purposes. For example, the preamble 510 may facilitate timing offset estimation by the base station 105. Additionally, the preamble 510 may supply an early indication of MCS, payload size, and resource allocation for the payload 515, which may provide a more efficient solution than a UCI piggyback on a PUSCH that includes the payload. In some cases, the resource allocation for the payload 515 may be based on a pre-defined mapping rule between the preamble 510 and the payload 515. The payload 515 may include a DMRS/PUSCH 535 portion for transmission of the payload of the first message 505, where the payload 515 may include a configurable payload size for different use cases and RRC states. For example, the payload 515 may include a minimum payload size (e.g., of 56/72 bits) and may not include a maximum (e.g., upper bound) payload size. In some cases, the payload 515 may include 1000 bits of small data from a user plane (UP) and/or control plane (CP).

Additionally, between each portion of first message 505 (e.g., between preamble 510 and payload 515), a guard time (GT) 525 may exist. For example, the base station 105 may configure the GT 525 to mitigate inter symbol interference (ISI) and/or inter carrier interference (ICI) for asynchronous uplink communications. In some cases, GT 525 may be referenced as a guard band (GB). A first GT 525-*a* may exist between preamble 510 and payload 515, and a second GT 525-*b* may exist after payload 515 and a subsequent preamble 510. Additionally, the base station 105 may also configure a transmission gap (e.g., TxG) 530 to extend the time between preamble 510 and payload 515. The transmission gap 530 may extend the first message 505 to occur over more than one symbol (e.g., or different TTI length). In some cases, each GT 525 may have a duration equal to $T_G$, and the transmission gap 530 may have a duration equal to $T_g$. Additionally, one or more guard bands 540 may be located on either sides of the frequency resources used for the first message 505 to provide a buffer between the first message 505 and any other transmissions on nearby frequencies.

In some cases, preamble 510 may map to one or more RACH occasions (ROs) 545. Accordingly, in the one or more RACH occasions 545, the UE 115 may transmit a PRACH preamble 550 for preamble 510. Additionally, payload 515 may map to one or more PUSCH occasions (POs) 555 that include PRUs 560 for transmitting payload 515. The one or more RACH occasions 545 and PUSCH occasions 555 may occupy a same set of time-frequency resources but may be divided based on different codes. Additionally or alternatively, although not shown, the one or more RACH occasions 545 and PUSCH occasions 555 may occupy different time-frequency resources and/or codes. In some cases, one or more SSBs 565 may indicate the time-frequency resources (e.g., and coding layers) for each of the one or more RACH occasions 545 and PUSCH occasions 555. Additionally, transmission gap 530 may exist between the preamble 510 on the corresponding RACH occasions 545 and the payload 515 on the corresponding PUSCH occasions 555.

Figure 6:
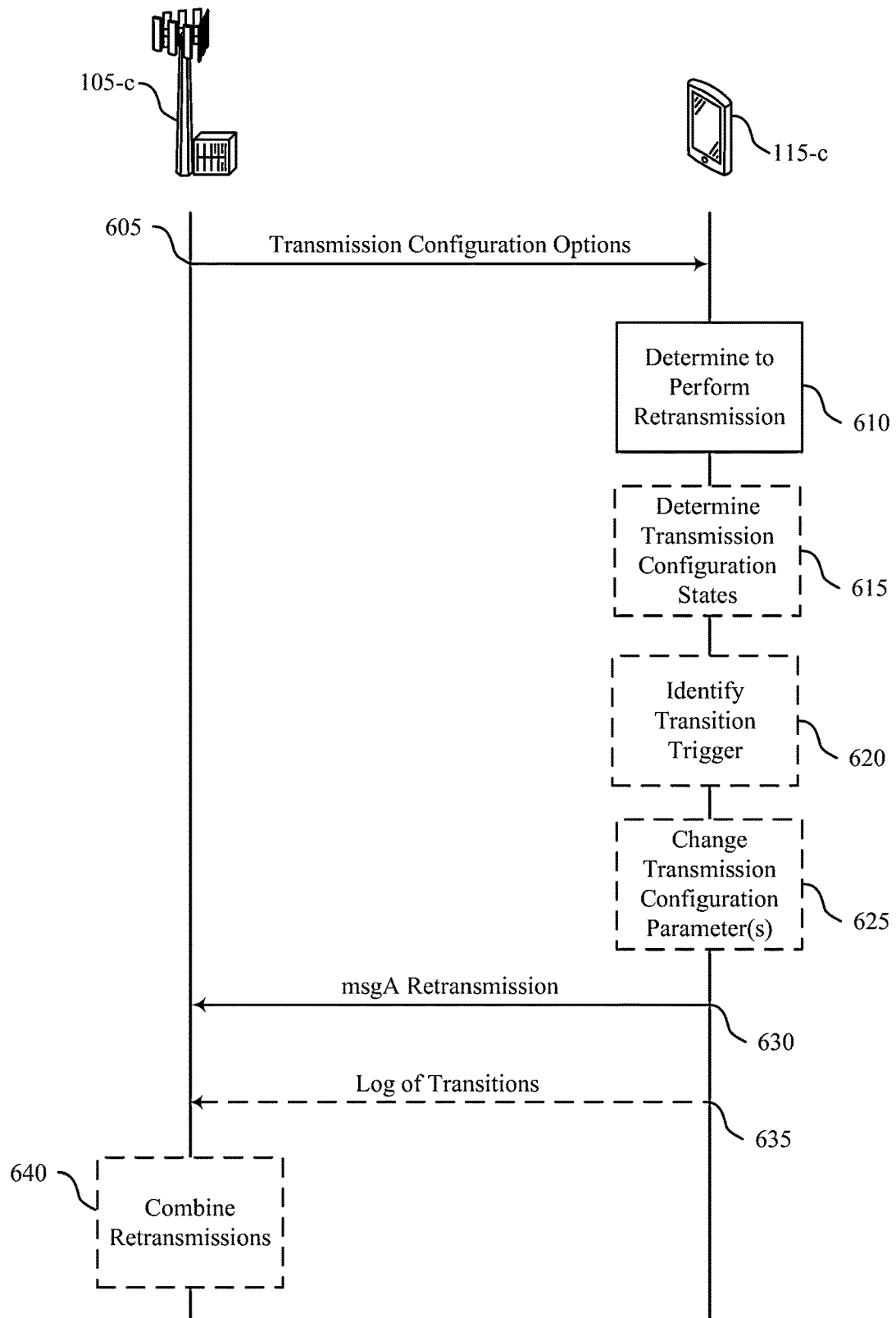
FIG. 6 illustrates an example of a process flow that supports adaptive retransmission for a RACH procedure in accordance with aspects of the present disclosure.

FIG. 6 illustrates an example of a process flow 600 that supports adaptive retransmission for a RACH procedure in accordance with aspects of the present disclosure. In some examples, process flow 600 may implement aspects of wireless communications systems 100 and/or 200. Process flow 600 may include a base station 105-*c* and a UE 115-*c*, which may be examples of corresponding base stations 105 and UEs 115, respectively, as described above with reference to FIGS. 1-5.

In the following description of the process flow 600, the operations between UE 115-*c* and base station 105-*c* may be transmitted in a different order than the order shown, or the operations performed by base station 105-*c* and UE 115-*c* may be performed in different orders or at different times. Certain operations may also be left out of the process flow 600, or other operations may be added to the process flow 600. It is to be understood that while base station 105-*c* and UE 115-*c* are shown performing a number of the operations of process flow 600, any wireless device may perform the operations shown.

At 605, UE 115-*c* may receive, from base station 105-*c*, a message indicating a set of transmission configuration options for retransmitting a first random access message of a random access procedure (e.g., a two-step RACH procedure). In some cases, the set of transmission configuration options may include an indication of which transmission configuration parameters are reconfigurable by UE 115-*c* for retransmission of the first random access message, where the transmission configuration parameters include a preamble sequence for a RACH occasion, an indication of a RACH occasion, a payload content, a payload size, a PRU, an MCS, a carrier, a frequency spectrum, a beam, a multi-panel or TRP configuration, a multi-panel/TRP configuration, a TRP, or a combination thereof. Additionally, the message indicating the set of transmission configuration options may include SI or RRC signaling.

At 610, UE 115-*c* may determine to perform a retransmission of the first random access message based on a retransmission trigger. In some cases, the retransmission trigger may include not receiving a fallback random access response message within a random access response window, not receiving a success random access response message within the random access response window, a counter of a number of retransmissions of the first random access message being less than or equal to a threshold number of retransmissions, or a combination thereof.

At 615, UE 115-c may determine a set of transmission configuration states for transmission and retransmission of the first random access message based on the set of transmission configuration options, where each transmission configuration state of the set of transmission configuration states includes a set of transmission configuration parameters, and where each transmission configuration state of the plurality of transmission configuration states differs by at least one transmission configuration parameter. In some cases, the at least one transmission configuration parameter may include a payload size, an MCS, a MIMO gain, a carrier, a frequency spectrum, a RACH occasion index, a PRU group index, or a combination thereof.

At 620, UE 115-c may identify a transition trigger to transition from a first transmission configuration state for a first transmission of the first random access message to a second transmission configuration state for the retransmission of the first random access message, where the retransmission of the first random access message is transmitted according to the second transmission configuration state based on the transition trigger. In some cases, UE 115-c may receive (e.g., via RRC signaling), from base station 105-c, the transition trigger, where the transition trigger includes an indication of a change of system loading information, a change of RACH resource allocations, a change in SSB association rules, a change of inter-cell interference measurement, a change of system information, or a combination thereof. Additionally or alternatively, UE 115-c may determine to transition from the first transmission configuration state to the second transmission configuration state based on a variation of a buffer status for the retransmission from the first transmission, a variation of a power headroom value for the retransmission from the first transmission, a QoS handling for the retransmission, or a combination thereof.

At 625, UE 115-c may determine to change at least one transmission configuration parameter from a first transmission of the first random access message to the retransmission of the first random access message based on the set of transmission configuration options.

At 630, UE 115-c may retransmit, to base station 105-c, the first random access message based on the set of transmission configuration options and the retransmission trigger. Additionally, UE 115-c may transmit, to base station 105-c, a message indicating a determined change to the at least one transmission configuration parameter from the first transmission of the first random access message to the retransmission of the first random access message. In some cases, UE 115-c may select a first transmission configuration state from the set of transmission configuration states for a first transmission of the first random access message, transmit the first transmission of the first random access message according to the first transmission configuration state to base station 105-c, and then may select a second transmission configuration state from the set of transmission configuration states for the retransmission of the first random access message, where the retransmission of the first random access message is transmitted according to the second transmission configuration state, where the second transmission configuration state is different than the first transmission configuration state.

Additionally or alternatively, UE 115-c may select a first transmission configuration state from the set of transmission configuration states for a first transmission of the first random access message, transmit the first transmission of the first random access message to base station 105-c according to the first transmission configuration state, where the retransmission of the first random access message is transmitted according to the first transmission configuration state based on a number of retransmissions of the first random access message being below a threshold number of retransmissions, and determine to transmit a second retransmission of the first random access message based on the retransmission trigger. Accordingly, in some cases, UE 115-c may select a second transmission configuration state from the set of transmission configuration states for the second retransmission, where the second transmission configuration state is selected based on the number of retransmissions of the first random access message exceeding the threshold number of retransmissions and may transmit, to base station 105-c, the second retransmission of the first random access message according to the second transmission configuration state based on the determination to transmit the second retransmission, where the second transmission configuration state is different than the first transmission configuration state.

At 635, UE 115-c may transmit, to base station 105-c, an indication of a log of transmission configuration state transitions for transmitting the first random access message, where the indication of the log of transmission configuration state transitions includes transmission configuration parameters used for transmission of the first random access message prior to the retransmission of the first random access message. In some cases, the indication of the log of transmission configuration state transitions may be indicated via a state-dependent group hopping of preamble and/or DMRS sequences, a state-dependent hopping of time-frequency resources used by a RACH occasion, a state-dependent hopping of time-frequency resources used by a PRU, a UCI message, an embedded indication in a payload of the first random access message, or a combination thereof.

At 640, base station 105-c may combine at least a subset of retransmissions of the first random access message based on the indication of the log of transmission configuration state transitions.

Figure 7:
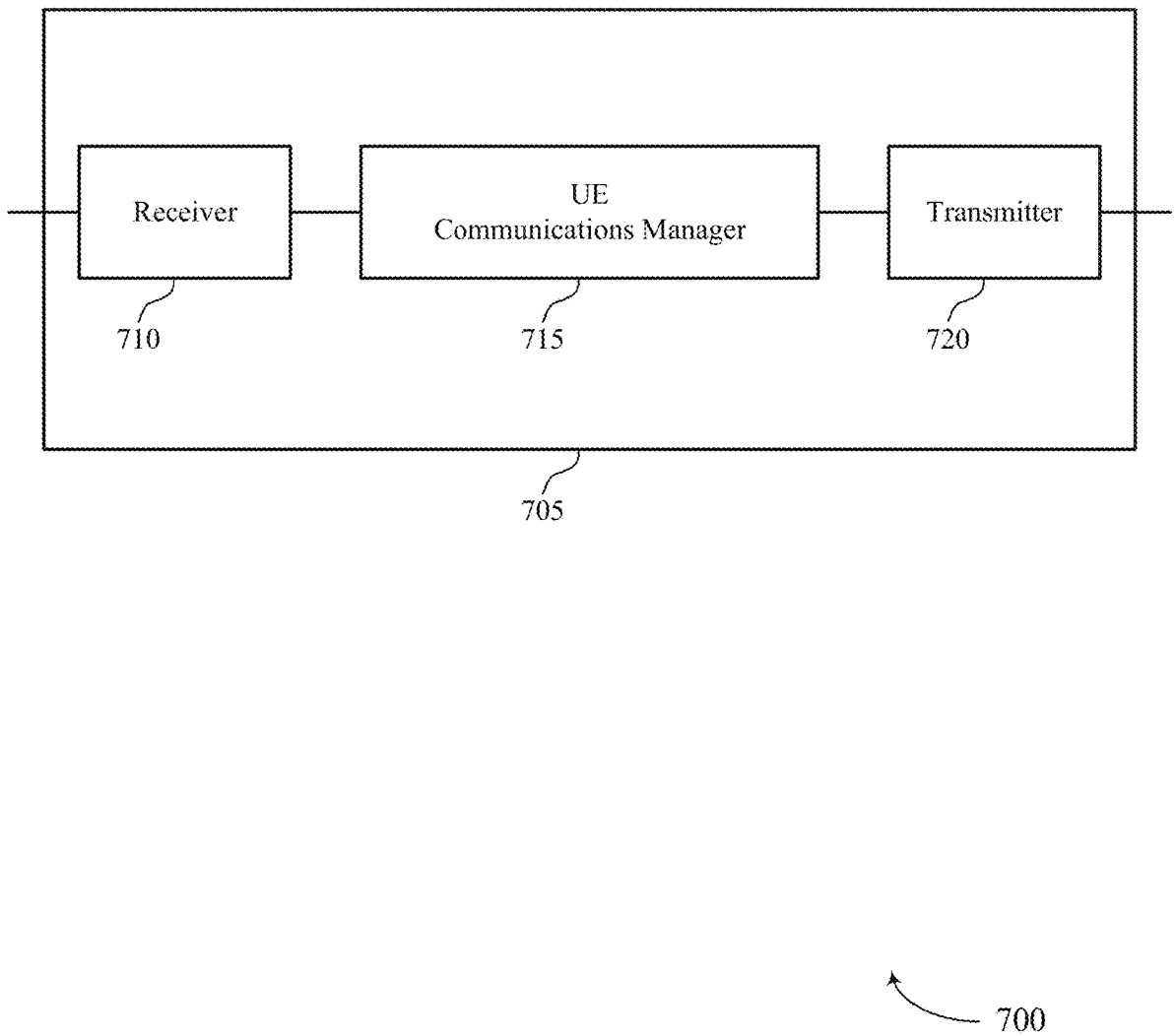
FIGS. 7 and 8 show block diagrams of devices that support adaptive retransmission for a RACH procedure in accordance with aspects of the present disclosure.

FIG. 7 shows a block diagram 700 of a device 705 that supports adaptive retransmission for a RACH procedure in accordance with aspects of the present disclosure. The device 705 may be an example of aspects of a UE 115 as described herein. The device 705 may include a receiver 710, a UE communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to adaptive retransmission for a RACH procedure, etc.). Information may be passed on to other components of the device 705. The receiver 710 may be an example of aspects of the transceiver 1020 described with reference to FIG. 10. The receiver 710 may utilize a single antenna or a set of antennas.

The UE communications manager 715 may receive, from a base station, a message indicating a set of transmission configuration options for retransmitting a first random access message of a random access procedure. In some cases, the UE communications manager 715 may determine to perform a retransmission of the first random access message based on a retransmission trigger. Accordingly, the UE communications manager 715 may retransmit, to the base station, the first random access message based on the set of transmission configuration options and the retransmission trigger. The UE communications manager 715 may be an example of aspects of the UE communications manager 1010 described herein.

Based on the actions performed by the UE communications manager 615 as described herein, a UE 115 may increase reliability of the first random access message being transmitted successfully. For example, by retransmitting the first random access message based on the set of transmission configuration options signaled by the base station, the UE may use transmission configuration parameters better suited for the retransmission of the first random access message than an initial first random access message transmission. Additionally, the UE 115 may reduce latency by limiting the number of retransmissions and more efficiently preparing the retransmissions prior to reattempting the RACH procedure.

The UE communications manager 715, or its sub-components, may be implemented in hardware, code (e.g., software or firmware) executed by a processor, or any combination thereof. If implemented in code executed by a processor, the functions of the UE communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 715, or its sub-components, may be physically located at various positions, including being distributed such that portions of functions are implemented at different physical locations by one or more physical components. In some examples, the UE communications manager 715, or its sub-components, may be a separate and distinct component in accordance with various aspects of the present disclosure. In some examples, the UE communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
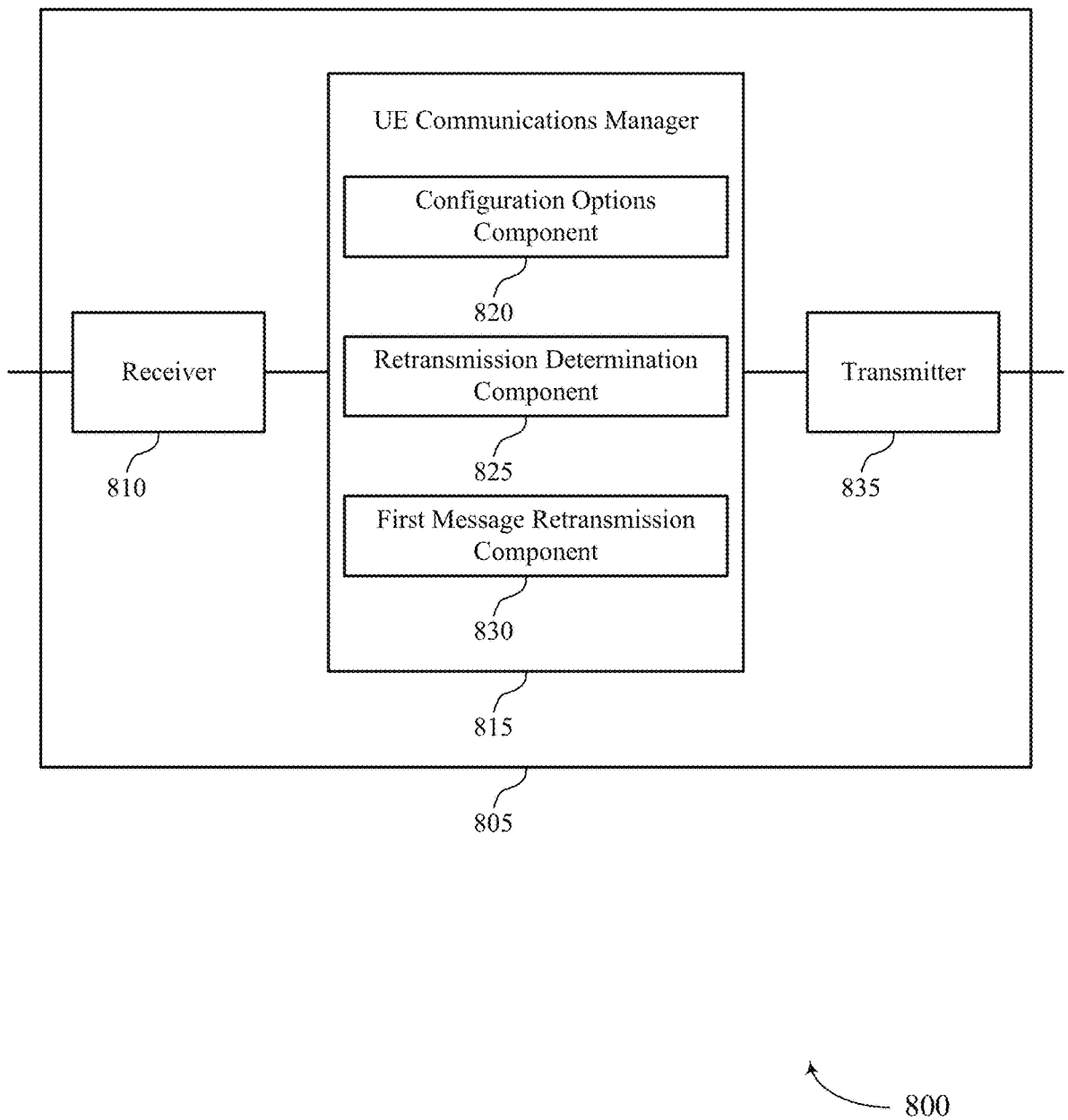

FIG. 8 shows a block diagram 800 of a device 805 that supports adaptive retransmission for a RACH procedure in accordance with aspects of the present disclosure. The device 805 may be an example of aspects of a device 705, or a UE 115 as described herein. The device 805 may include a receiver 810, a UE communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to adaptive retransmission for a RACH procedure, etc.). Information may be passed on to other components of the device 805. The receiver 810 may be an example of aspects of the transceiver 1020 described with reference to FIG. 10. The receiver 810 may utilize a single antenna or a set of antennas.

The UE communications manager 815 may be an example of aspects of the UE communications manager 715 as described herein. The UE communications manager 815 may include a configuration options component 820, a retransmission determination component 825, and a first message retransmission component 830. The UE communications manager 815 may be an example of aspects of the UE communications manager 1010 described herein.

The configuration options component 820 may receive, from a base station, a message indicating a set of transmission configuration options for retransmitting a first random access message of a random access procedure.

The retransmission determination component 825 may determine to perform a retransmission of the first random access message based on a retransmission trigger.

The first message retransmission component 830 may retransmit, to the base station, the first random access message based on the set of transmission configuration options and the retransmission trigger.

Based on determining to perform the retransmission and retransmitting the first random access message based on the set of transmission configuration options, a processor of a UE 115 (e.g., controlling the receiver 810, the transmitter 835, or a transceiver 1020 as described with reference to FIG. 10) may efficiently prepare the retransmission of the first random access message to improve chances the first random access message is successfully transmitted to a base station 105. Additionally, the processor may save power at various components of the UE 115 by the efficient adaptive preparation of the first random access message retransmission based on possibly reducing the number of retransmission attempts. Conventionally, the processor may use a same set of configuration transmission parameters to transmit the retransmissions, which may increase the number of retransmission attempts as the retransmissions may fail in a similar manner as an initial transmission of the first random access message based on the same configuration transmission parameters. By using a reconfiguration for the retransmission based on the set of transmission configuration options, the processor may expend less power preparing the first random access message for a fewer number of retransmission attempts.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
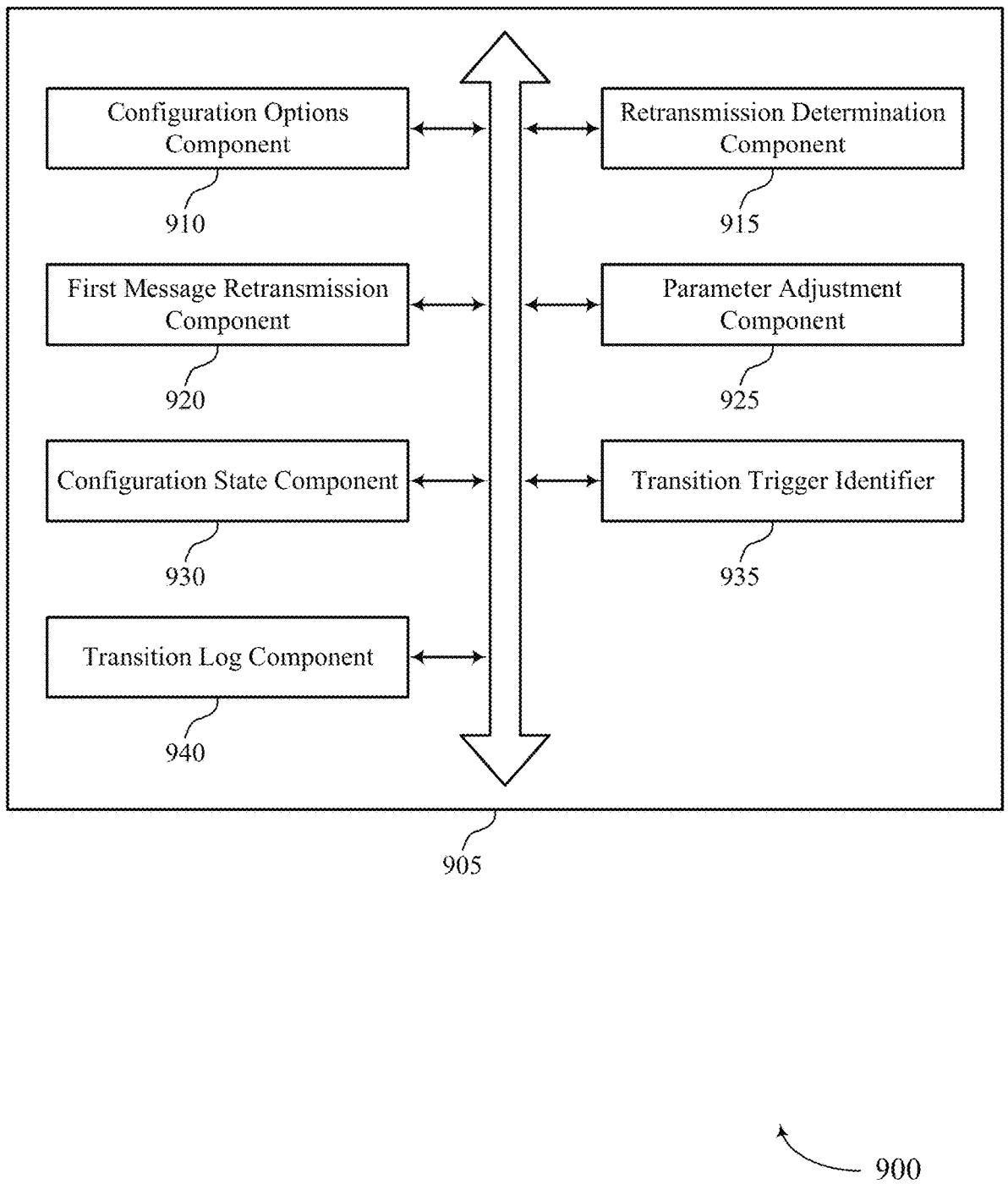
FIG. 9 shows a block diagram of a UE communications manager that supports adaptive retransmission for a RACH procedure in accordance with aspects of the present disclosure.

FIG. 9 shows a block diagram 900 of a UE communications manager 905 that supports adaptive retransmission for a RACH procedure in accordance with aspects of the present disclosure. The UE communications manager 905 may be an example of aspects of a UE communications manager 715, a UE communications manager 815, or a UE communications manager 1010 described herein. The UE communications manager 905 may include a configuration options component 910, a retransmission determination component 915, a first message retransmission component 920, a parameter adjustment component 925, a configuration state component 930, a transition trigger identifier 935, and a transition log component 940. Each of these modules may communicate, directly or indirectly, with one another (e.g., via one or more buses).

The configuration options component 910 may receive, from a base station, a message indicating a set of transmission configuration options for retransmitting a first random access message of a random access procedure. In some cases, the set of transmission configuration options may include an indication of which transmission configuration parameters are reconfigurable by the UE for the retransmission of the first random access message. Additionally, the transmission configuration parameters may include a preamble sequence for a RACH occasion, an indication of a RACH occasion, a payload content, a payload size, a PRU, n MCS, a carrier, a frequency spectrum, a beam, a multi-panel or TRP configuration, or a combination thereof. In some cases, the message indicating the set of transmission configuration options may be transmitted via SI or RRC signaling. Additionally, the random access procedure may be a two-step RACH procedure.

The retransmission determination component 915 may determine to perform a retransmission of the first random access message based on a retransmission trigger. In some cases, the retransmission trigger may include not receiving a fallback random access response message within a random access response window, not receiving a success random access response message within the random access response window, a counter of a number of retransmissions of the first random access message being less than or equal to a threshold number of retransmissions, or a combination thereof.

The first message retransmission component 920 may retransmit, to the base station, the first random access message based on the set of transmission configuration options and the retransmission trigger.

The parameter adjustment component 925 may determine to change at least one transmission configuration parameter from a first transmission of the first random access message to the retransmission of the first random access message based on the set of transmission configuration options. In some examples, the parameter adjustment component 925 may transmit, to the base station, a message indicating the determined change to the at least one transmission configuration parameter from the first transmission of the first random access message to the retransmission of the first random access message.

The configuration state component 930 may determine a set of transmission configuration states for transmission and retransmission of the first random access message based on the set of transmission configuration options, where each transmission configuration state of the set of transmission configuration states includes a set of transmission configuration parameters, and where each transmission configuration state of the set of transmission configuration states differs by at least one transmission configuration parameter. In some cases, the at least one transmission configuration parameter may include a payload size, n MCS, a MIMO gain, a carrier, a frequency spectrum, a RACH occasion index, a PRU group index, or a combination thereof.

In some examples, the configuration state component 930 may select a first transmission configuration state from the set of transmission configuration states for a first transmission of the first random access message, transmit, to the base station, the first transmission of the first random access message according to the first transmission configuration state, select a second transmission configuration state from the set of transmission configuration states for the retransmission of the first random access message, where the retransmission of the first random access message is transmitted according to the second transmission configuration state, where the second transmission configuration state is different than the first transmission configuration state.

Additionally or alternatively, the configuration state component 930 may transmit, to the base station, the first transmission of the first random access message according to the first transmission configuration state, where the retransmission of the first random access message is transmitted according to the first transmission configuration state based on a number of retransmissions of the first random access message being below a threshold number of retransmissions, determine to transmit a second retransmission of the first random access message based on the retransmission trigger, select a second transmission configuration state from the set of transmission configuration states for the second retransmission, where the second transmission configuration state is selected based on the number of retransmissions of the first random access message exceeding the threshold number of retransmissions. Accordingly, the configuration state component 930 may transmit, to the base station, the second retransmission of the first random access message according to the second transmission configuration state based on the determination to transmit the second retransmission, where the second transmission configuration state is different than the first transmission configuration state.

The transition trigger identifier 935 may identify a transition trigger to transition from a first transmission configuration state for a first transmission of the first random access message to a second transmission configuration state for the retransmission of the first random access message, where the retransmission of the first random access message is transmitted according to the second transmission configuration state based on the transition trigger. In some examples, the transition trigger identifier 935 may receive, from the base station, the transition trigger, where the transition trigger includes an indication of a change of system loading information, a change of random access resource allocations, a change in synchronization signal block association rules, a change of inter-cell interference measurement, a change of system information, or a combination thereof. In some cases, the transition trigger is received in RRC signaling.

Additionally or alternatively, the transition trigger identifier 935 may determine to transition from the first transmission configuration state to the second transmission configuration state based on a variation of a buffer status for the retransmission from the first transmission, a variation of a power headroom value for the retransmission from the first transmission, a quality of service handling for the retransmission, or a combination thereof.

The transition log component 940 may transmit, to the base station, an indication of a log of transmission configuration state transitions for transmitting the first random access message, where the indication of the log of transmission configuration state transitions includes transmission configuration parameters used for transmission of the first random access message prior to the retransmission of the first random access message. In some cases, the indication of the log of transmission configuration state transitions may be indicated via a state-dependent group hopping of preamble and/or DMRS sequences, a state-dependent hopping of time-frequency resources used by a RACH occasion, a state-dependent hopping of time-frequency resources used by a PRU, a UCI message, an embedded indication in a payload of the first random access message, or a combination thereof.

Figure 10:
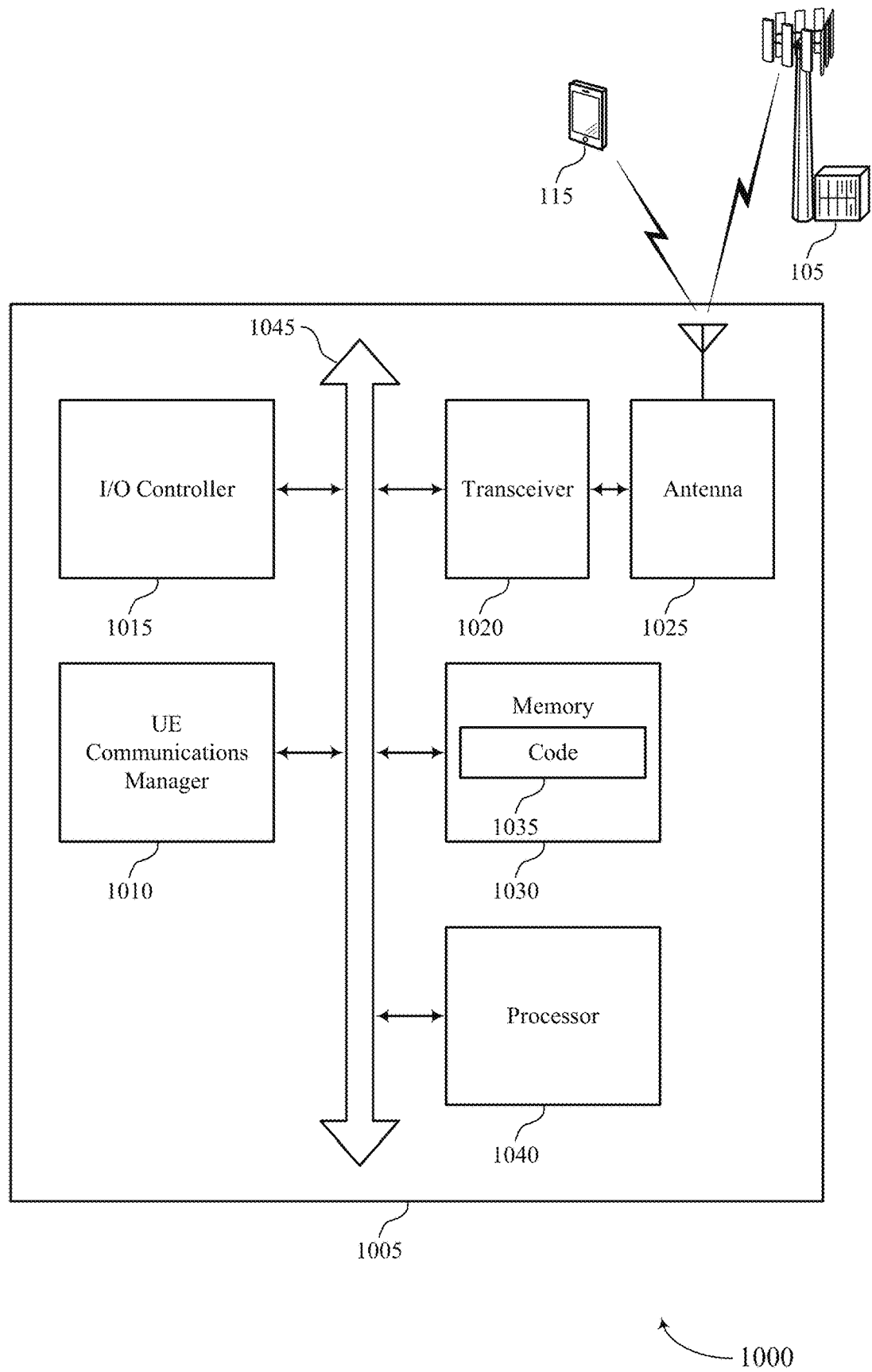
FIG. 10 shows a diagram of a system including a device that supports adaptive retransmission for a RACH procedure in accordance with aspects of the present disclosure.

FIG. 10 shows a diagram of a system 1000 including a device 1005 that supports adaptive retransmission for a RACH procedure in accordance with aspects of the present disclosure. The device 1005 may be an example of or include the components of device 705, device 805, or a UE 115 as described herein. The device 1005 may include components for bi-directional voice and data communications including components for transmitting and receiving communications, including a UE communications manager 1010, an I/O controller 1015, a transceiver 1020, an antenna 1025, memory 1030, and a processor 1040. These components may be in electronic communication via one or more buses (e.g., bus 1045).

The UE communications manager 1010 may receive, from a base station, a message indicating a set of transmission configuration options for retransmitting a first random access message of a random access procedure. In some cases, the UE communications manager 1010 may determine to perform a retransmission of the first random access message based on a retransmission trigger. Accordingly, the UE communications manager 1010 may retransmit, to the base station, the first random access message based on the set of transmission configuration options and the retransmission trigger.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting adaptive retransmission for a RACH procedure).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
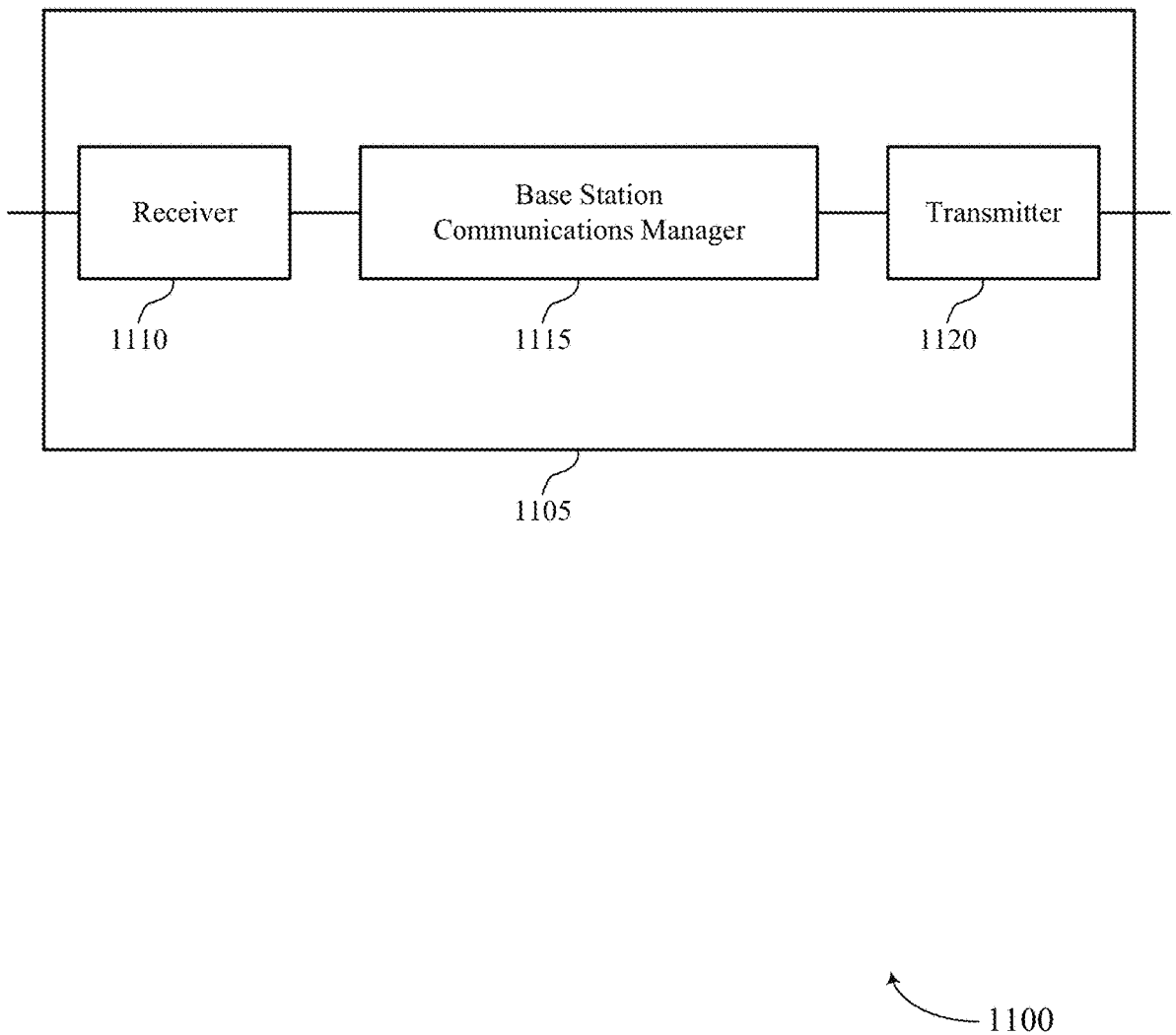
FIGS. 11 and 12 show block diagrams of devices that support adaptive retransmission for a RACH procedure in accordance with aspects of the present disclosure.

FIG. 11 shows a block diagram 1100 of a device 1105 that supports adaptive retransmission for a RACH procedure in accordance with aspects of the present disclosure. The device 1105 may be an example of aspects of a base station 105 as described herein. The device 1105 may include a receiver 1110, a base station communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to adaptive retransmission for a RACH procedure, etc.). Information may be passed on to other components of the device 1105. The receiver 1110 may be an example of aspects of the transceiver 1420 described with reference to FIG. 14. The receiver 1110 may utilize a single antenna or a set of antennas.

The base station communications manager 1115 may transmit, to a UE, a message indicating a set of transmission configuration options for retransmitting a first random access message of a random access procedure. In some cases, the base station communications manager 1115 may receive, from the UE, a first transmission of the first random access message. Additionally, the base station communications manager 1115 may receive, from the UE, a retransmission of the first random access message based on the set of transmission configuration options and a retransmission trigger. The base station communications manager 1115 may be an example of aspects of the base station communications manager 1410 described herein.

The base station communications manager 1115, or its sub-components, may be implemented in hardware, code (e.g., software or firmware) executed by a processor, or any combination thereof. If implemented in code executed by a processor, the functions of the base station communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1115, or its sub-components, may be physically located at various positions, including being distributed such that portions of functions are implemented at different physical locations by one or more physical components. In some examples, the base station communications manager 1115, or its sub-components, may be a separate and distinct component in accordance with various aspects of the present disclosure. In some examples, the base station communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
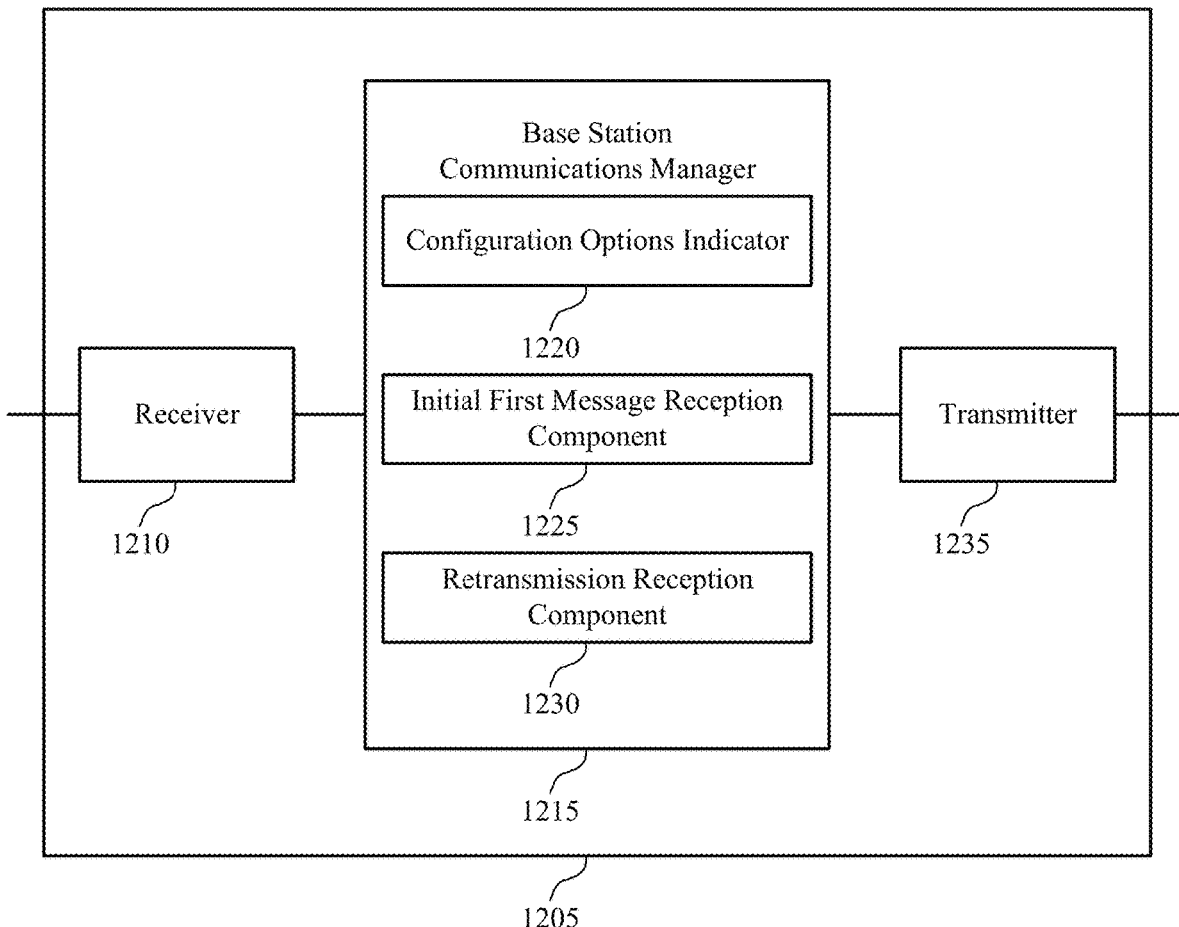

FIG. 12 shows a block diagram 1200 of a device 1205 that supports adaptive retransmission for a RACH procedure in accordance with aspects of the present disclosure. The device 1205 may be an example of aspects of a device 1105, or a base station 105 as described herein. The device 1205 may include a receiver 1210, a base station communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to adaptive retransmission for a RACH procedure, etc.). Information may be passed on to other components of the device 1205. The receiver 1210 may be an example of aspects of the transceiver 1420 described with reference to FIG. 14. The receiver 1210 may utilize a single antenna or a set of antennas.

The base station communications manager 1215 may be an example of aspects of the base station communications manager 1115 as described herein. The base station communications manager 1215 may include a configuration options indicator 1220, an initial first message reception component 1225, and a retransmission reception component 1230. The base station communications manager 1215 may be an example of aspects of the base station communications manager 1410 described herein.

The configuration options indicator 1220 may transmit, to a UE, a message indicating a set of transmission configuration options for retransmitting a first random access message of a random access procedure.

The initial first message reception component 1225 may receive, from the UE, a first transmission of the first random access message.

The retransmission reception component 1230 may receive, from the UE, a retransmission of the first random access message based on the set of transmission configuration options and a retransmission trigger.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
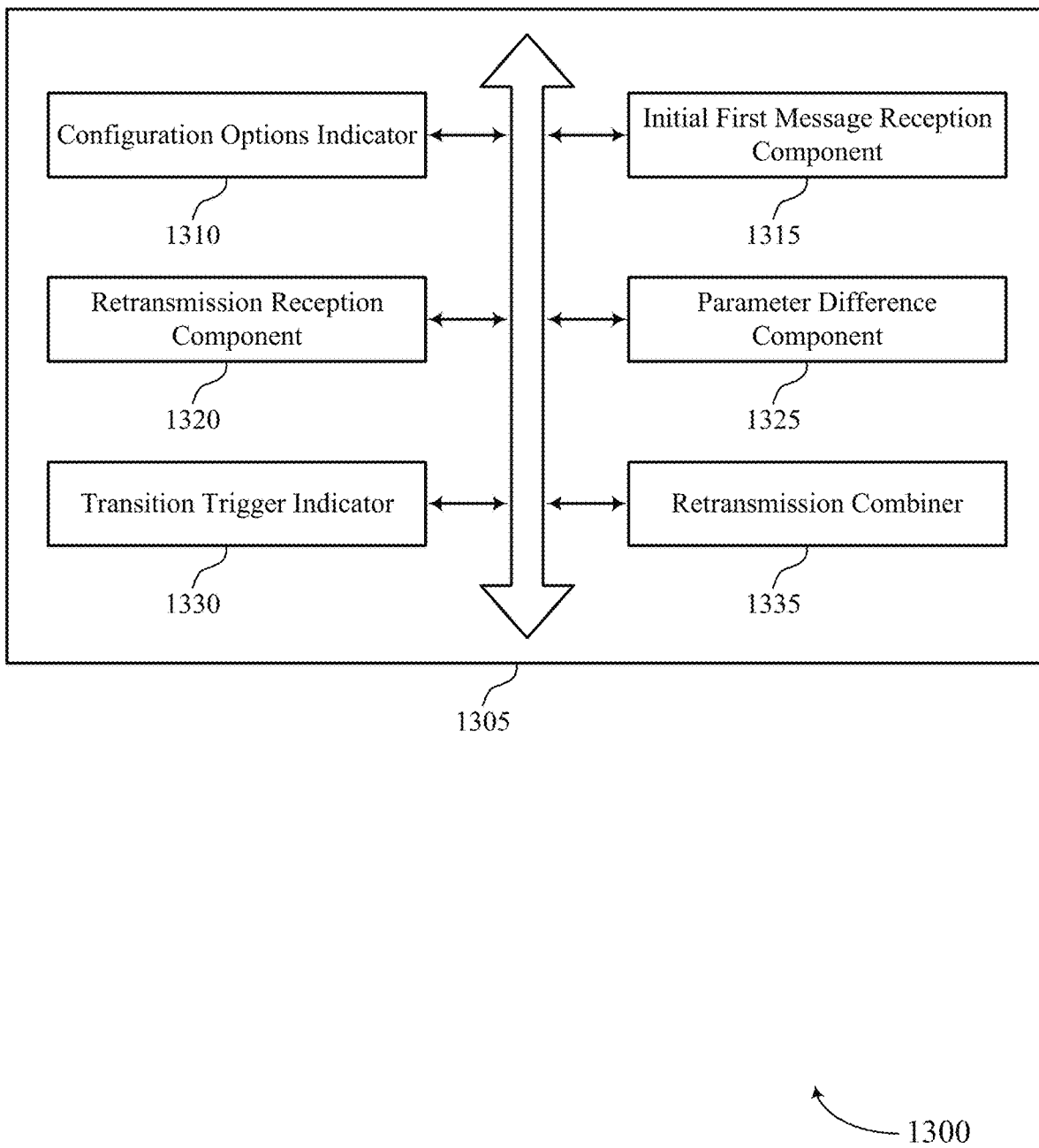
FIG. 13 shows a block diagram of a base station communications manager that supports adaptive retransmission for a RACH procedure in accordance with aspects of the present disclosure.

FIG. 13 shows a block diagram 1300 of a base station communications manager 1305 that supports adaptive retransmission for a RACH procedure in accordance with aspects of the present disclosure. The base station communications manager 1305 may be an example of aspects of a base station communications manager 1115, a base station communications manager 1215, or a base station communications manager 1410 described herein. The base station communications manager 1305 may include a configuration options indicator 1310, an initial first message reception component 1315, a retransmission reception component 1320, a parameter difference component 1325, a transition trigger indicator 1330, and a retransmission combiner 1335. Each of these modules may communicate, directly or indirectly, with one another (e.g., via one or more buses).

The configuration options indicator 1310 may transmit, to a UE, a message indicating a set of transmission configuration options for retransmitting a first random access message of a random access procedure. In some cases, the set of transmission configuration options may include an indication of which transmission configuration parameters are reconfigurable by the UE for the retransmission of the first random access message. Additionally, the transmission configuration parameters may include a preamble sequence for a RACH occasion, an indication of a RACH occasion, a payload content, a payload size, a PRU, an MCS, a carrier, a frequency spectrum, a beam, a multi-panel or TRP configuration, or a combination thereof. In some cases, the message indicating the set of transmission configuration options may be transmitted via SI or RRC signaling. Additionally, the random access procedure includes a two-step RACH procedure.

The initial first message reception component 1315 may receive, from the UE, a first transmission of the first random access message.

The retransmission reception component 1320 may receive, from the UE, a retransmission of the first random access message based on the set of transmission configuration options and a retransmission trigger. In some cases, the first transmission of the first random access message may be received according to a first transmission configuration state, and the retransmission of the first random access message may be received according to a second transmission configuration state, the second transmission configuration state being different by at least one transmission configuration parameter than the first transmission configuration state.

Additionally or alternatively, the first transmission of the first random access message and the retransmission of the first random access message may be received according to a first transmission configuration state, the retransmission of the first random access message being received according to the first transmission configuration state based on a number of retransmissions of the first random access message being below a threshold number of retransmissions. Accordingly, the retransmission reception component 1320 may receive, from the UE, a second retransmission of the first random access message according to a second transmission configuration state based on the number of retransmissions of the first random access message exceeding the threshold number of retransmissions, where the second transmission configuration state is different by at least one transmission configuration parameter than the first transmission configuration state.

The parameter difference component 1325 may determine that at least one transmission configuration parameter for the first transmission of the first random access message is different than a corresponding transmission configuration parameter for the retransmission of the first random access message based on the set of transmission configuration options. In some examples, the parameter difference component 1325 may receive, from the UE, a message indicating the at least one transmission configuration parameter for the first transmission of the first random access message that is different than the corresponding transmission configuration parameter for the retransmission of the first random access message. In some cases, the at least one transmission configuration parameter may include a payload size, an MCS, a MIMO gain, a carrier, a frequency spectrum, a RACH occasion index, a PRU group index, or a combination thereof.

The transition trigger indicator 1330 may transmit, to the UE, a transition trigger to transition from a first transmission configuration state for the first transmission of the first random access message to a second transmission configuration state for the retransmission of the first random access message, where the transition trigger includes an indication of a change of system loading information, a change of random access resource allocations, a change in synchronization signal block association rules, a change of inter-cell interference measurement, a change of system information, or a combination thereof. In some cases, the transition trigger may be transmitted in radio resource control signaling.

The retransmission combiner 1335 may receive, from the UE, an indication of a log of transmission configuration state transitions the UE used for transmitting the first random access message, where the indication of the log of transmission configuration state transitions includes transmission configuration parameters the UE used for transmission of the first random access message prior to the retransmission of the first random access message. In some examples, the retransmission combiner 1335 may combine at least a subset of retransmissions of the first random access message based on the indication of the log of transmission configuration state transitions. Additionally, the indication of the log of transmission configuration state transitions may be indicated via a state-dependent group hopping of preamble and/or DMRS sequences, a state-dependent hopping of time-frequency resources used by a RACH occasion, a state-dependent hopping of time-frequency resources used by a PRU, a UCI message, an embedded indication in a payload of the first random access message, or a combination thereof.

Figure 14:
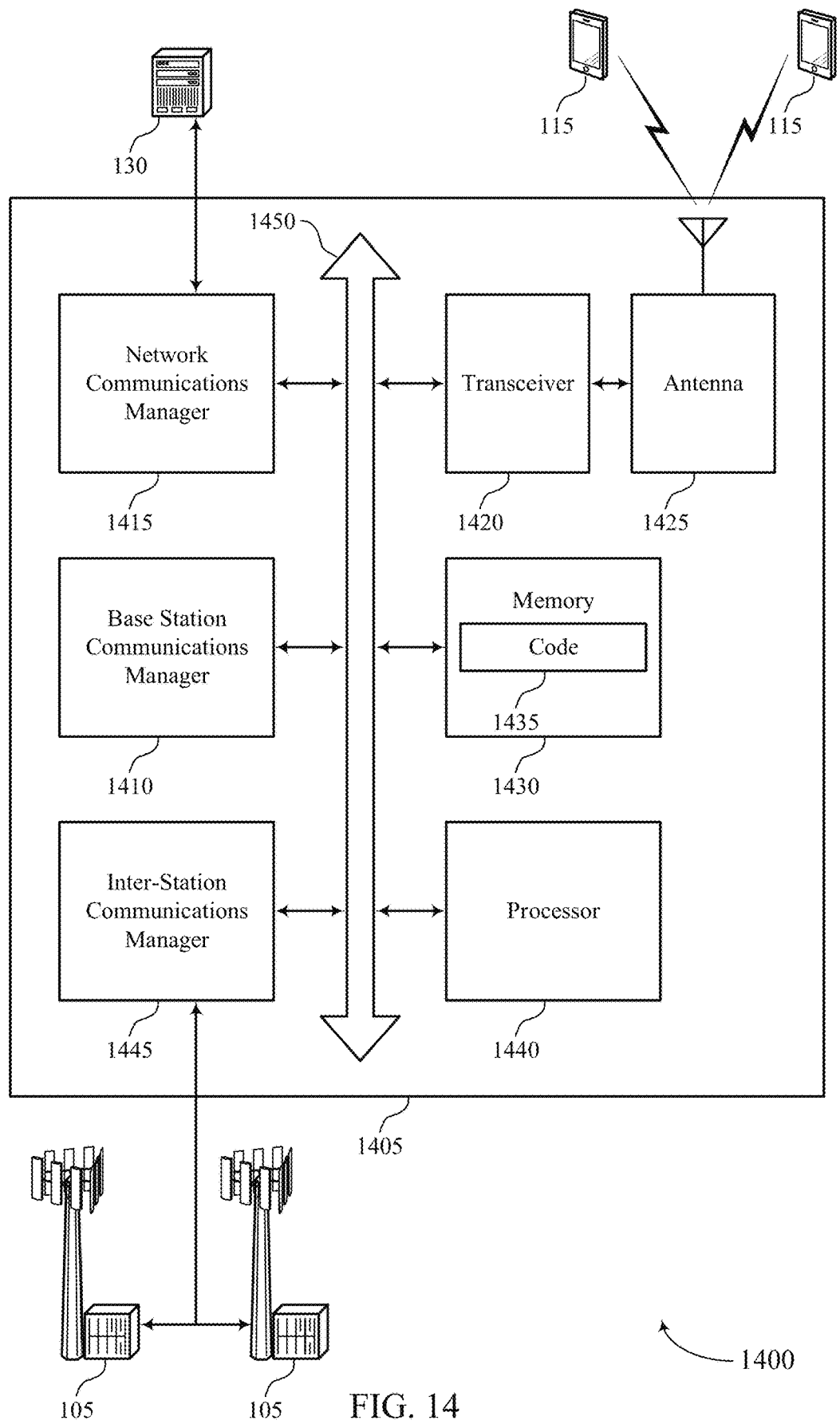
FIG. 14 shows a diagram of a system including a device that supports adaptive retransmission for a RACH procedure in accordance with aspects of the present disclosure.

FIG. 14 shows a diagram of a system 1400 including a device 1405 that supports adaptive retransmission for a RACH procedure in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a base station communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The base station communications manager 1410 may transmit, to a UE, a message indicating a set of transmission configuration options for retransmitting a first random access message of a random access procedure. In some cases, the base station communications manager 1410 may receive, from the UE, a first transmission of the first random access message. Additionally, the base station communications manager 1410 may receive, from the UE, a retransmission of the first random access message based on the set of transmission configuration options and a retransmission trigger.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting adaptive retransmission for a RACH procedure).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
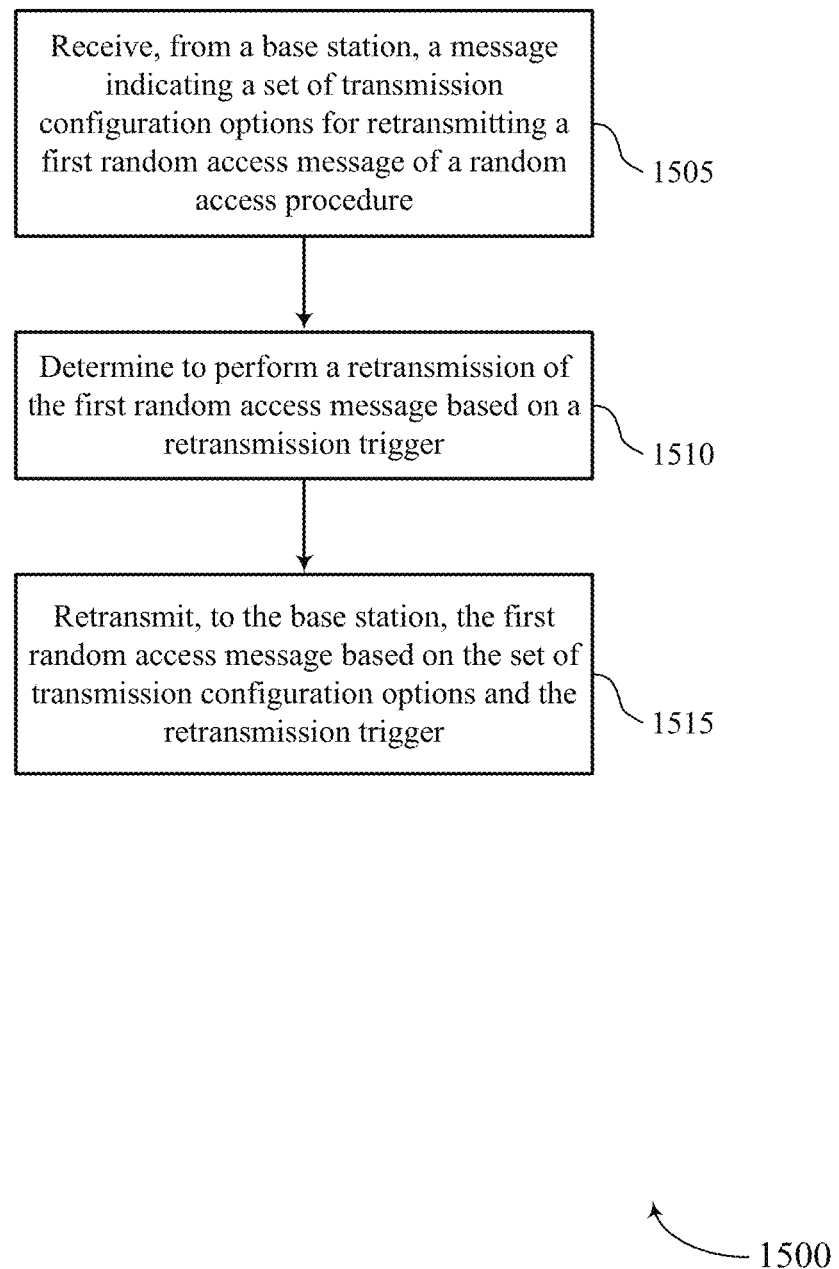
FIGS. 15 through 21 show flowcharts illustrating methods that support adaptive retransmission for a RACH procedure in accordance with aspects of the present disclosure.

FIG. 15 shows a flowchart illustrating a method 1500 that supports adaptive retransmission for a RACH procedure in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a message indicating a set of transmission configuration options for retransmitting a first random access message of a random access procedure. The operations of 1505 may be performed according to the methods described herein. In some examples, aspects of the operations of 1505 may be performed by a configuration options component as described with reference to FIGS. 7 through 10.

At 1510, the UE may determine to perform a retransmission of the first random access message based on a retransmission trigger. The operations of 1510 may be performed according to the methods described herein. In some examples, aspects of the operations of 1510 may be performed by a retransmission determination component as described with reference to FIGS. 7 through 10.

At 1515, the UE may retransmit, to the base station, the first random access message based on the set of transmission configuration options and the retransmission trigger. The operations of 1515 may be performed according to the methods described herein. In some examples, aspects of the operations of 1515 may be performed by a first message retransmission component as described with reference to FIGS. 7 through 10.

Figure 16:
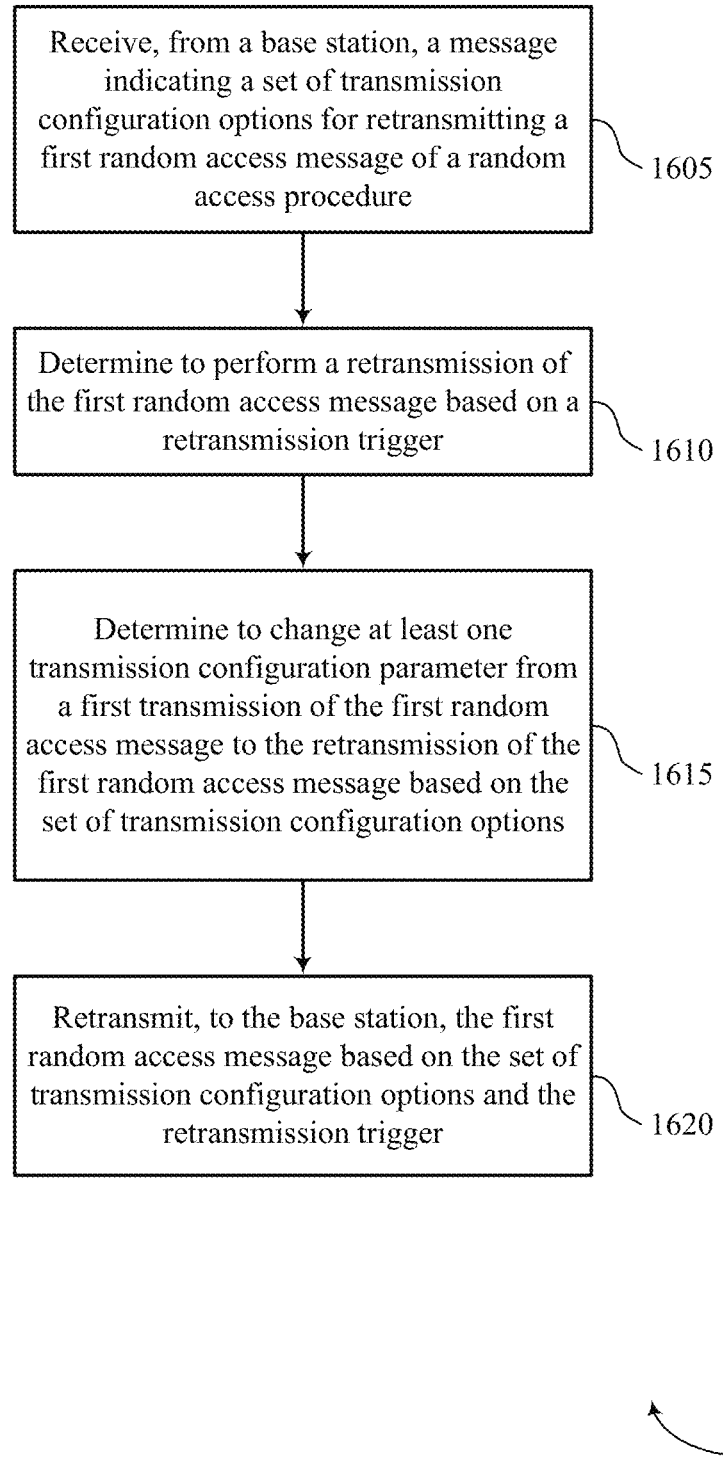

FIG. 16 shows a flowchart illustrating a method 1600 that supports adaptive retransmission for a RACH procedure in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a message indicating a set of transmission configuration options for retransmitting a first random access message of a random access procedure. The operations of 1605 may be performed according to the methods described herein. In some examples, aspects of the operations of 1605 may be performed by a configuration options component as described with reference to FIGS. 7 through 10.

At 1610, the UE may determine to perform a retransmission of the first random access message based on a retransmission trigger. The operations of 1610 may be performed according to the methods described herein. In some examples, aspects of the operations of 1610 may be performed by a retransmission determination component as described with reference to FIGS. 7 through 10.

At 1615, the UE may determine to change at least one transmission configuration parameter from a first transmission of the first random access message to the retransmission of the first random access message based on the set of transmission configuration options. The operations of 1615 may be performed according to the methods described herein. In some examples, aspects of the operations of 1615 may be performed by a parameter adjustment component as described with reference to FIGS. 7 through 10.

At 1620, the UE may retransmit, to the base station, the first random access message based on the set of transmission configuration options and the retransmission trigger. The operations of 1620 may be performed according to the methods described herein. In some examples, aspects of the operations of 1620 may be performed by a first message retransmission component as described with reference to FIGS. 7 through 10.

Figure 17:
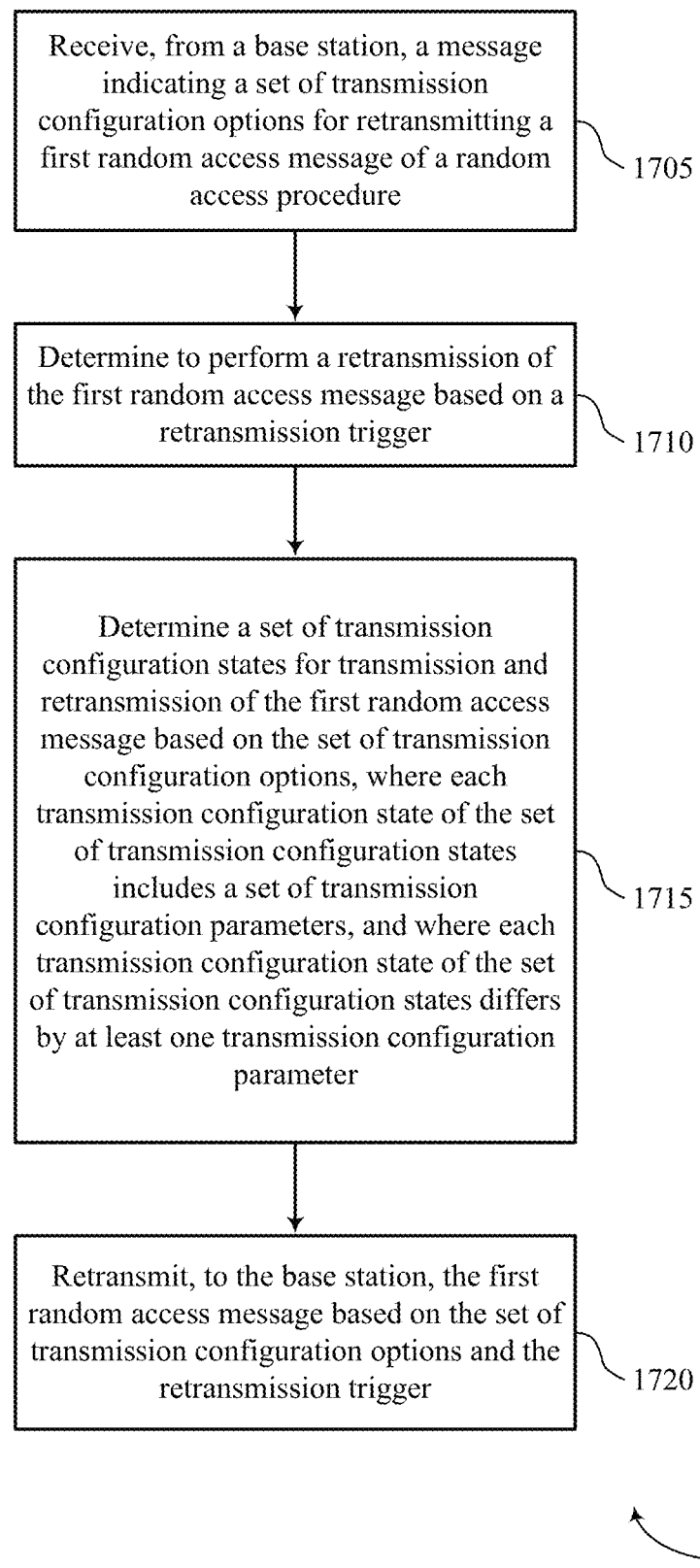

FIG. 17 shows a flowchart illustrating a method 1700 that supports adaptive retransmission for a RACH procedure in accordance with aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a message indicating a set of transmission configuration options for retransmitting a first random access message of a random access procedure. The operations of 1705 may be performed according to the methods described herein. In some examples, aspects of the operations of 1705 may be performed by a configuration options component as described with reference to FIGS. 7 through 10.

At 1710, the UE may determine to perform a retransmission of the first random access message based on a retransmission trigger. The operations of 1710 may be performed according to the methods described herein. In some examples, aspects of the operations of 1710 may be performed by a retransmission determination component as described with reference to FIGS. 7 through 10.

At 1715, the UE may determine a set of transmission configuration states for transmission and retransmission of the first random access message based on the set of transmission configuration options, where each transmission configuration state of the set of transmission configuration states includes a set of transmission configuration parameters, and where each transmission configuration state of the set of transmission configuration states differs by at least one transmission configuration parameter. The operations of 1715 may be performed according to the methods described herein. In some examples, aspects of the operations of 1715 may be performed by a configuration state component as described with reference to FIGS. 7 through 10.

At 1720, the UE may retransmit, to the base station, the first random access message based on the set of transmission configuration options and the retransmission trigger. The operations of 1720 may be performed according to the methods described herein. In some examples, aspects of the operations of 1720 may be performed by a first message retransmission component as described with reference to FIGS. 7 through 10.

Figure 18:
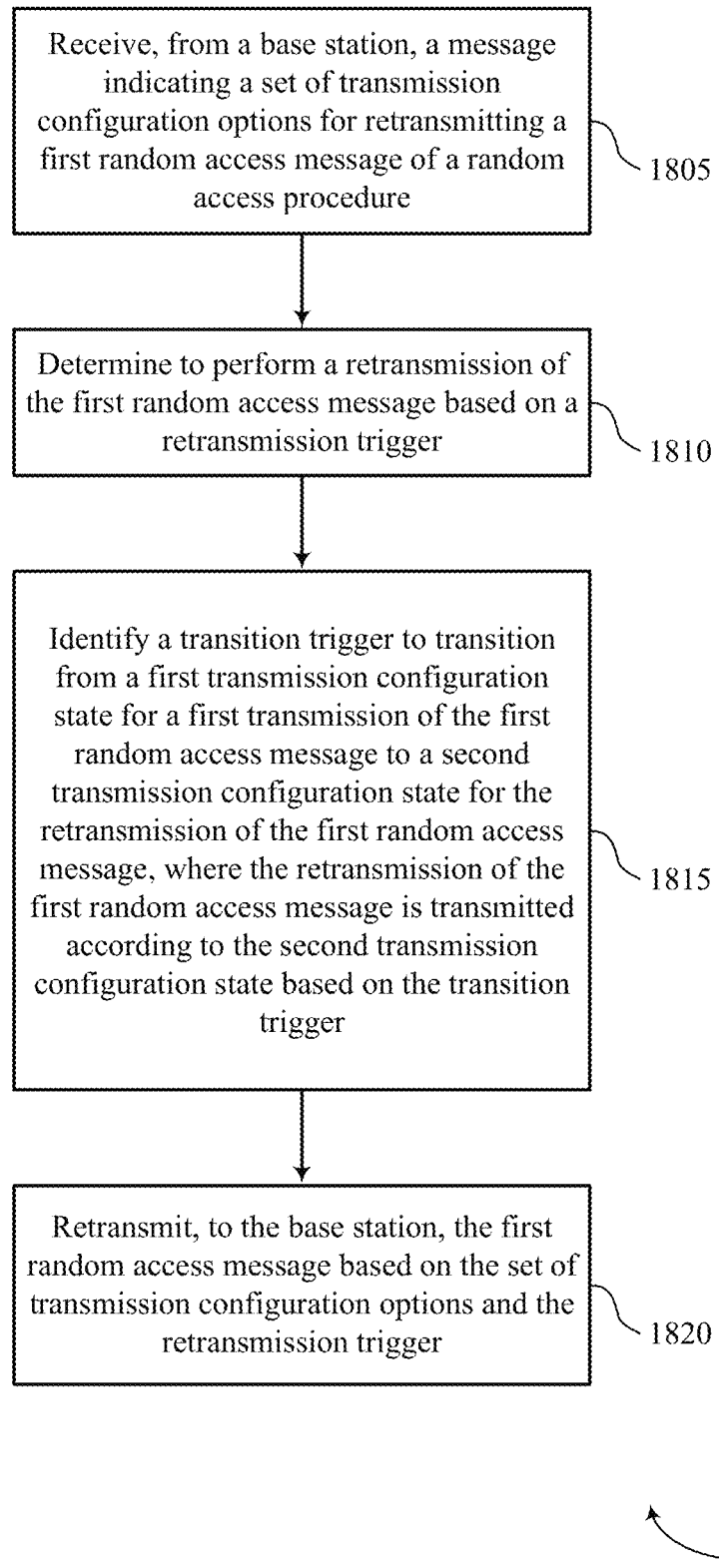

FIG. 18 shows a flowchart illustrating a method 1800 that supports adaptive retransmission for a RACH procedure in accordance with aspects of the present disclosure. The operations of method 1800 may be implemented by a UE 115 or its components as described herein. For example, the operations of method 1800 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a message indicating a set of transmission configuration options for retransmitting a first random access message of a random access procedure. The operations of 1805 may be performed according to the methods described herein. In some examples, aspects of the operations of 1805 may be performed by a configuration options component as described with reference to FIGS. 7 through 10.

At 1810, the UE may determine to perform a retransmission of the first random access message based on a retransmission trigger. The operations of 1810 may be performed according to the methods described herein. In some examples, aspects of the operations of 1810 may be performed by a retransmission determination component as described with reference to FIGS. 7 through 10.

At 1815, the UE may identify a transition trigger to transition from a first transmission configuration state for a first transmission of the first random access message to a second transmission configuration state for the retransmission of the first random access message, where the retransmission of the first random access message is transmitted according to the second transmission configuration state based on the transition trigger. The operations of 1815 may be performed according to the methods described herein. In some examples, aspects of the operations of 1815 may be performed by a transition trigger identifier as described with reference to FIGS. 7 through 10.

At 1820, the UE may retransmit, to the base station, the first random access message based on the set of transmission configuration options and the retransmission trigger. The operations of 1820 may be performed according to the methods described herein. In some examples, aspects of the operations of 1820 may be performed by a first message retransmission component as described with reference to FIGS. 7 through 10.

Figure 19:
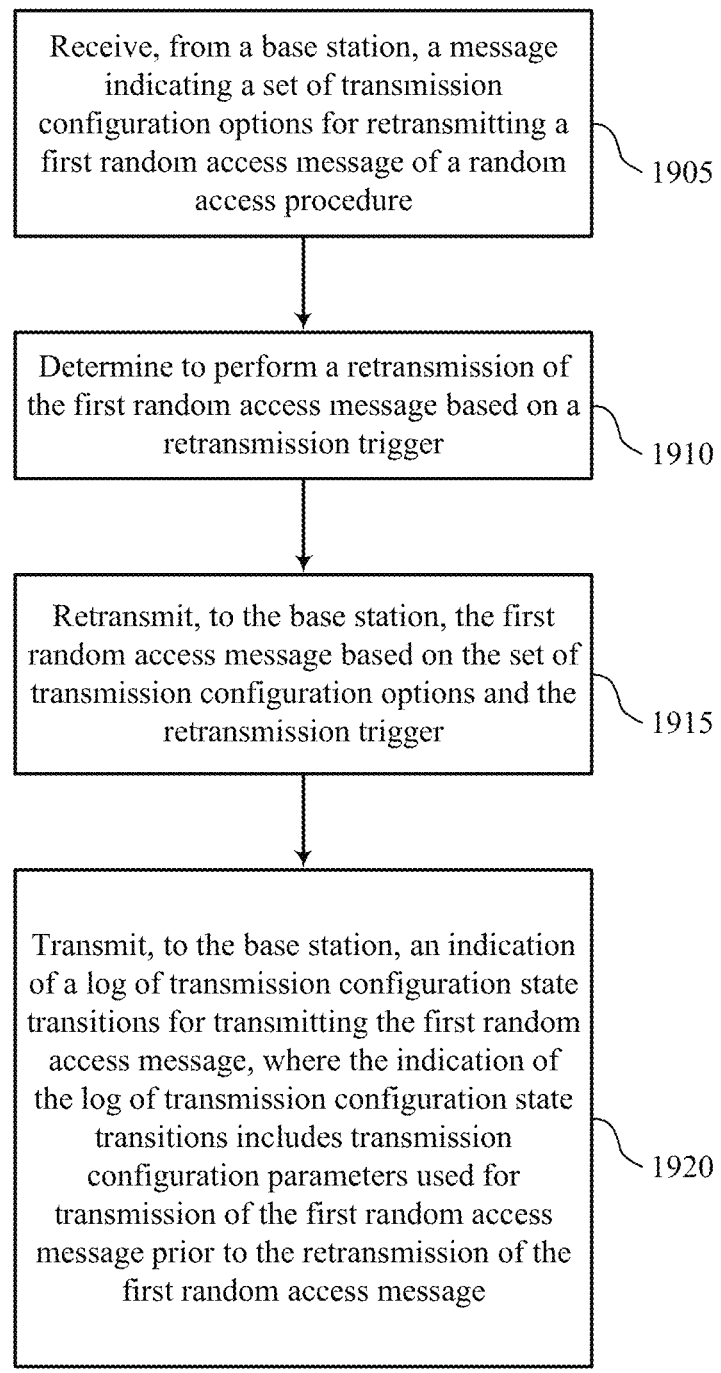

FIG. 19 shows a flowchart illustrating a method 1900 that supports adaptive retransmission for a RACH procedure in accordance with aspects of the present disclosure. The operations of method 1900 may be implemented by a UE 115 or its components as described herein. For example, the operations of method 1900 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, a message indicating a set of transmission configuration options for retransmitting a first random access message of a random access procedure. The operations of 1905 may be performed according to the methods described herein. In some examples, aspects of the operations of 1905 may be performed by a configuration options component as described with reference to FIGS. 7 through 10.

At 1910, the UE may determine to perform a retransmission of the first random access message based on a retransmission trigger. The operations of 1910 may be performed according to the methods described herein. In some examples, aspects of the operations of 1910 may be performed by a retransmission determination component as described with reference to FIGS. 7 through 10.

At 1915, the UE may retransmit, to the base station, the first random access message based on the set of transmission configuration options and the retransmission trigger. The operations of 1915 may be performed according to the methods described herein. In some examples, aspects of the operations of 1915 may be performed by a first message retransmission component as described with reference to FIGS. 7 through 10.

At 1920, the UE may transmit, to the base station, an indication of a log of transmission configuration state transitions for transmitting the first random access message, where the indication of the log of transmission configuration state transitions includes transmission configuration parameters used for transmission of the first random access message prior to the retransmission of the first random access message. The operations of 1920 may be performed according to the methods described herein. In some examples, aspects of the operations of 1920 may be performed by a transition log component as described with reference to FIGS. 7 through 10.

Figure 20:
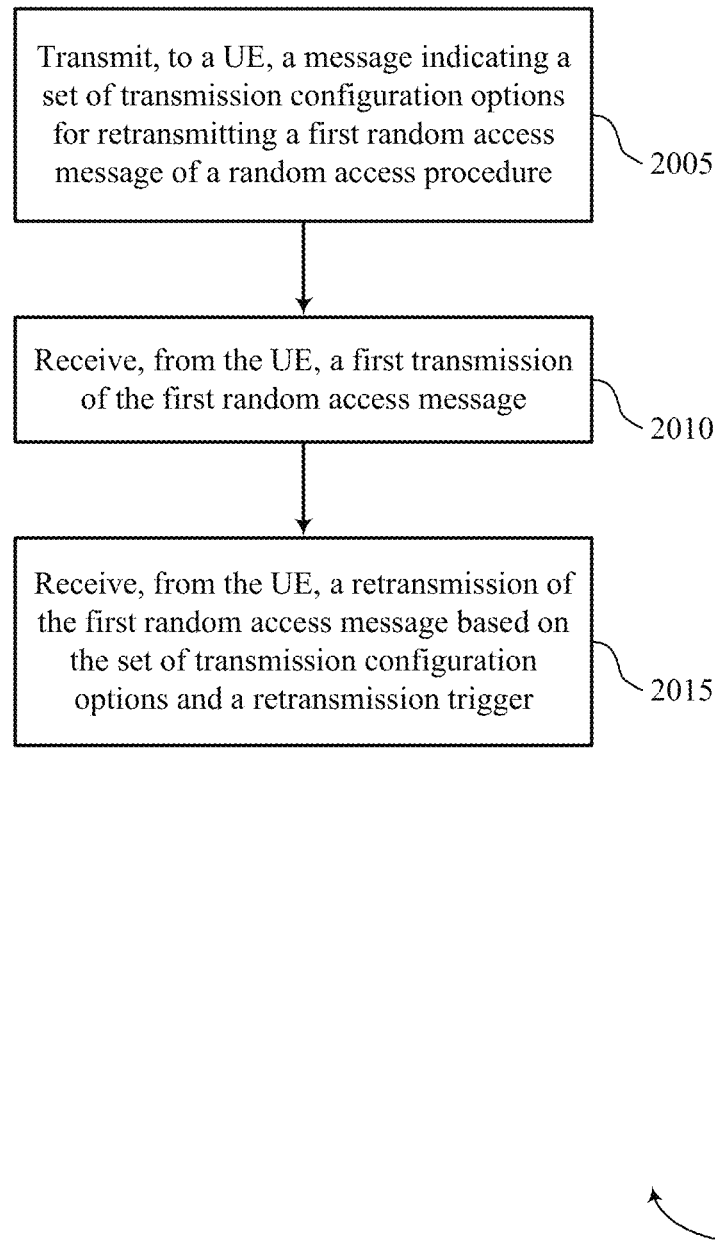

FIG. 20 shows a flowchart illustrating a method 2000 that supports adaptive retransmission for a RACH procedure in accordance with aspects of the present disclosure. The operations of method 2000 may be implemented by a base station 105 or its components as described herein. For example, the operations of method 2000 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, a message indicating a set of transmission configuration options for retransmitting a first random access message of a random access procedure. The operations of 2005 may be performed according to the methods described herein. In some examples, aspects of the operations of 2005 may be performed by a configuration options indicator as described with reference to FIGS. 11 through 14.

At 2010, the base station may receive, from the UE, a first transmission of the first random access message. The operations of 2010 may be performed according to the methods described herein. In some examples, aspects of the operations of 2010 may be performed by an initial first message reception component as described with reference to FIGS. 11 through 14.

At 2015, the base station may receive, from the UE, a retransmission of the first random access message based on the set of transmission configuration options and a retransmission trigger. The operations of 2015 may be performed according to the methods described herein. In some examples, aspects of the operations of 2015 may be performed by a retransmission reception component as described with reference to FIGS. 11 through 14.

Figure 21:
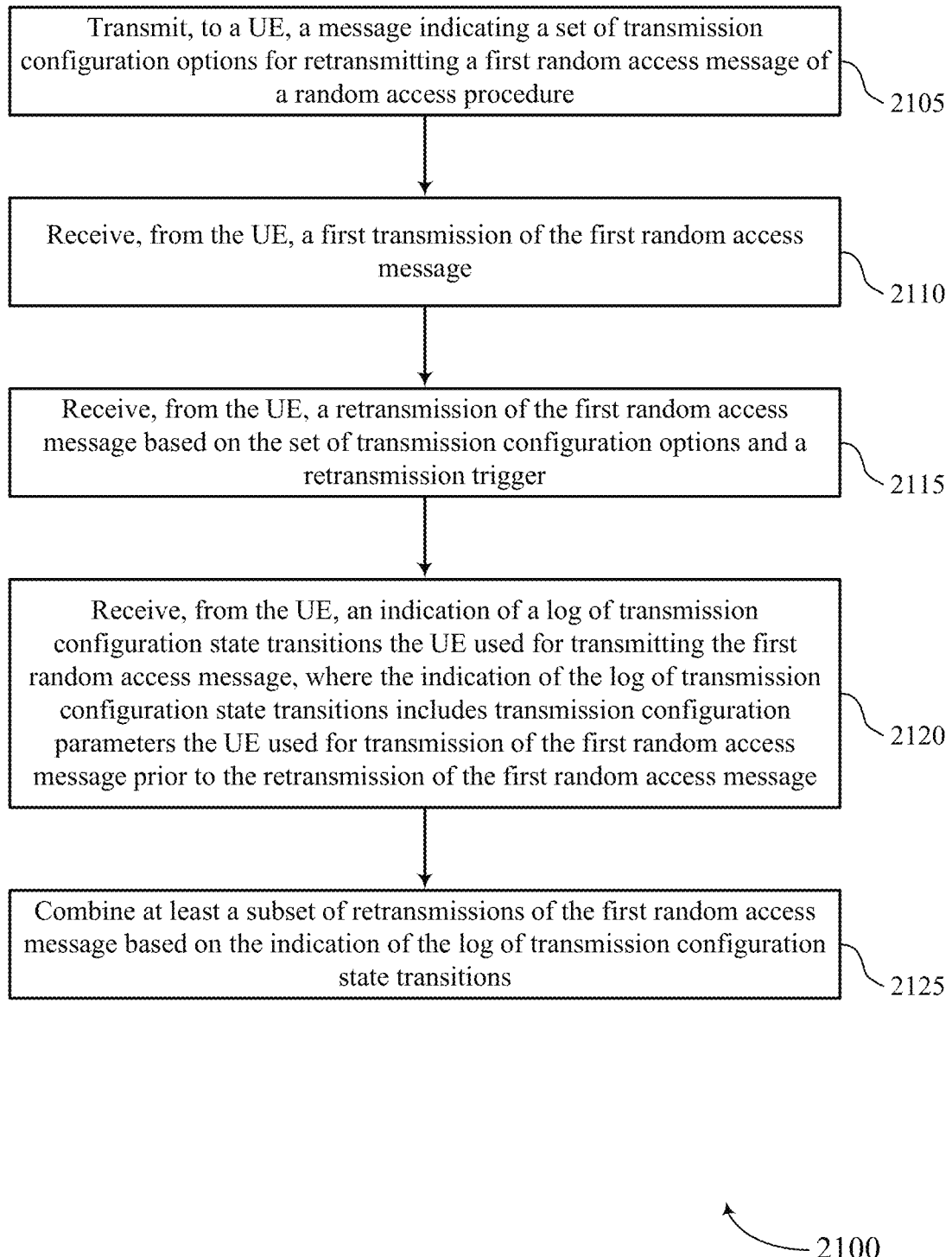

FIG. 21 shows a flowchart illustrating a method 2100 that supports adaptive retransmission for a RACH procedure in accordance with aspects of the present disclosure. The operations of method 2100 may be implemented by a base station 105 or its components as described herein. For example, the operations of method 2100 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, a message indicating a set of transmission configuration options for retransmitting a first random access message of a random access procedure. The operations of 2105 may be performed according to the methods described herein. In some examples, aspects of the operations of 2105 may be performed by a configuration options indicator as described with reference to FIGS. 11 through 14.

At 2110, the base station may receive, from the UE, a first transmission of the first random access message. The operations of 2110 may be performed according to the methods described herein. In some examples, aspects of the operations of 2110 may be performed by an initial first message reception component as described with reference to FIGS. 11 through 14.

At 2115, the base station may receive, from the UE, a retransmission of the first random access message based on the set of transmission configuration options and a retransmission trigger. The operations of 2115 may be performed according to the methods described herein. In some examples, aspects of the operations of 2115 may be performed by a retransmission reception component as described with reference to FIGS. 11 through 14.

At 2120, the base station may receive, from the UE, an indication of a log of transmission configuration state transitions the UE used for transmitting the first random access message, where the indication of the log of transmission configuration state transitions includes transmission configuration parameters the UE used for transmission of the first random access message prior to the retransmission of the first random access message. The operations of 2120 may be performed according to the methods described herein. In some examples, aspects of the operations of 2120 may be performed by a retransmission combiner as described with reference to FIGS. 11 through 14.

At 2125, the base station may combine at least a subset of retransmissions of the first random access message based on the indication of the log of transmission configuration state transitions. The operations of 2125 may be performed according to the methods described herein. In some examples, aspects of the operations of 2125 may be performed by a retransmission combiner as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims. "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving, from a base station, a message indicating a plurality of transmission configuration options for retransmitting a first random access message of a random access procedure;
    determining to perform a set of retransmissions of the first random access message based at least in part on a retransmission trigger;
    identifying a transition trigger to transition from a first transmission configuration state to a second transmission configuration state; and
    transmitting, to the base station, a set of retransmissions of a second random access message according to the second transmission configuration state and based at least in part on the transition trigger, the plurality of transmission configuration options, and the retransmission trigger.

2. The method of claim 1, further comprising:
    determining to change at least one transmission configuration parameter from a first transmission of the first random access message to the set of retransmissions of the first random access message based at least in part on the plurality of transmission configuration options.

3. The method of claim 2, further comprising:
    outputting an indication of the determination to change the at least one transmission configuration parameter from the first transmission of the first random access message to the set of retransmissions of the first random access message.

4. The method of claim 1, further comprising:
    determining a plurality of transmission configuration states for transmission and retransmission of the first random access message based at least in part on the plurality of transmission configuration options, wherein each transmission configuration state of the plurality of transmission configuration states comprises a set of transmission configuration parameters, and wherein each transmission configuration state of the plurality of transmission configuration states differs by at least one transmission configuration parameter.

5. The method of claim 4, further comprising:
    selecting the first transmission configuration state from the plurality of transmission configuration states for a first transmission of the first random access message;
    transmitting, to the base station, the first transmission of the first random access message according to the first transmission configuration state; and selecting the second transmission configuration state from the plurality of transmission configuration states for the retransmission of the first random access message, wherein the retransmission of the first random access message is transmitted according to the second transmission configuration state, wherein the second transmission configuration state is different than the first transmission configuration state.

6. The method of claim 4, further comprising:
selecting the first transmission configuration state from the plurality of transmission configuration states for a first transmission of the first random access message;
transmitting, to the base station, the first transmission of the first random access message according to the first transmission configuration state, wherein the retransmission of the first random access message is transmitted according to the first transmission configuration state based at least in part on a number of retransmissions of the first random access message being below a threshold number of retransmissions;
determining to transmit a second retransmission of the first random access message based at least in part on the retransmission trigger;
selecting the second transmission configuration state from the plurality of transmission configuration states for the second retransmission, wherein the second transmission configuration state is selected based at least in part on the number of retransmissions of the first random access message exceeding the threshold number of retransmissions; and
transmitting, to the base station, the second retransmission of the first random access message according to the second transmission configuration state based at least in part on the determination to transmit the second retransmission, wherein the second transmission configuration state is different than the first transmission configuration state.

7. The method of claim 4, wherein the at least one transmission configuration parameter comprises a payload size, a modulation and coding scheme, a multiple-input multiple-output antenna configuration, a carrier, a frequency spectrum, a random access occasion index, a physical uplink channel resource unit group index, or a combination thereof.

8. The method of claim 1, wherein identifying the transition trigger comprises:
receiving, from the base station, the transition trigger, wherein the transition trigger comprises an indication of a change of system loading information, a change of random access resource allocations, a change in synchronization signal block association rules, a change of inter-cell interference measurement, a change of system information, or a combination thereof.

9. The method of claim 8, wherein the transition trigger is received in radio resource control signaling.

10. The method of claim 1, wherein identifying the transition trigger comprises:
determining to transition from the first transmission configuration state to the second transmission configuration state based at least in part on a variation of a buffer status for the set of retransmissions from a first transmission, a variation of a power headroom value for the set of retransmissions from a first transmission, a quality of service handling for the set of retransmissions, or a combination thereof.

11. The method of claim 1, wherein retransmitting the first random access message further comprises:
transmitting, to the base station, an indication of a log of transmission configuration state transitions for transmitting the first random access message, wherein the indication of the log of transmission configuration state transitions comprises transmission configuration parameters used for transmission of the first random access message prior to the set of retransmissions of the first random access message.

12. The method of claim 11, wherein the indication of the log of transmission configuration state transitions is indicated via a state-dependent group hopping of preamble sequences, a state-dependent group hopping of demodulation reference signal sequences, a state-dependent hopping of time-frequency resources used by a random access occasion, a state-dependent hopping of time-frequency resources used by a physical uplink channel resource unit, an uplink control information message, an embedded indication in a payload of the first random access message, or a combination thereof.

13. The method of claim 1, wherein the plurality of transmission configuration options comprises an indication of which transmission configuration parameters are reconfigurable by the UE for the set of retransmissions of the first random access message.

14. The method of claim 13, wherein the transmission configuration parameters comprise a preamble sequence for a random access occasion, an indication of the random access occasion, a payload content, a payload size, a physical uplink channel resource unit, a modulation and coding scheme, a carrier, a frequency spectrum, a beam, a multi-panel or transmission/reception point configuration, a transmission/reception point, or a combination thereof.

15. The method of claim 1, wherein the retransmission trigger comprises not receiving a fallback random access response message within a random access response window, not receiving a success random access response message within the random access response window, a counter of a number of retransmissions of the first random access message being less than or equal to a threshold number of retransmissions, or a combination thereof.

16. The method of claim 1, wherein the message indicating the plurality of transmission configuration options comprises system information or radio resource control signaling.

17. The method of claim 1, wherein the random access procedure comprises a two-step random access procedure.

18. A method for wireless communications at a base station, comprising:
transmitting, to a user equipment (UE), a message indicating a plurality of transmission configuration options for retransmitting a first random access message of a random access procedure;
receiving, from the UE, a set of retransmissions of the first random access message, transmitted according to a first transmission configuration state; and
receiving, from the UE, a a set of retransmissions of a second random access message according to a second transmission configuration state and based at least in part on a transmission trigger, the plurality of transmission configuration options and a retransmission trigger.

19. The method of claim 18, further comprising:
determining that at least one transmission configuration parameter for the set of retransmissions of the first random access message is different than a corresponding transmission configuration parameter for the set of retransmissions of the second random access message based at least in part on the plurality of transmission configuration options.

20. The method of claim 19, further comprising:
receiving, from the UE, a second message indicating the at least one transmission configuration parameter for the set of retransmissions of the first random access message that is different than the corresponding transmission configuration parameter for the set of retransmissions of the second random access message.

21. The method of claim 19, wherein the at least one transmission configuration parameter comprises a payload size, a modulation and coding scheme, a multiple-input multiple-output antenna configuration, a carrier, a frequency spectrum, a random access occasion index, a physical uplink channel resource unit group index, or a combination thereof.

22. The method of claim 18, wherein the second transmission configuration state being different by at least one transmission configuration parameter than the first transmission configuration state.

23. The method of claim 18, wherein the set of retransmissions of the first random access message is received according to the first transmission configuration state based at least in part on a number of retransmissions of the first random access message being below a threshold number of retransmissions.

24. The method of claim 23,
wherein the second transmission configuration state is different by at least one transmission configuration parameter than the first transmission configuration state.

25. The method of claim 18, further comprising:
transmitting, to the UE, a transition trigger to transition from the first transmission configuration state for the set of retransmissions of the first random access message to the second transmission configuration state for the set of retransmissions of the second random access message, wherein the transition trigger comprises an indication of a change of system loading information, a change of random access resource allocations, a change in synchronization signal block association rules, a change of inter-cell interference measurement, a change of system information, or a combination thereof.

26. The method of claim 25, wherein the transition trigger is transmitted in radio resource control signaling.

27. The method of claim 18, wherein receiving the set of retransmissions of the first random access message further comprises:
receiving, from the UE, an indication of a log of transmission configuration state transitions the UE used for transmitting the first random access message, wherein the indication of the log of transmission configuration state transitions comprises transmission configuration parameters the UE used for the set of retransmission of the first random access message prior to the set of retransmissions of the second random access message.

28. The method of claim 27, further comprising:
combining at least a subset of the set of retransmissions of the first random access message based at least in part on the indication of the log of transmission configuration state transitions.

29. The method of claim 27, wherein the indication of the log of transmission configuration state transitions is indicated via a state-dependent group hopping of preamble sequences, a state-dependent group hopping of demodulation reference signal sequences, a state-dependent hopping of time-frequency resources used by a random access occasion, a state-dependent hopping of time-frequency resources used by a physical uplink channel resource unit, an uplink control information message, an embedded indication in a payload of the first random access message, or a combination thereof.

30. The method of claim 18, wherein the plurality of transmission configuration options comprises an indication of which transmission configuration parameters are reconfigurable by the UE for the set of retransmissions of the first random access message.

31. The method of claim 30, wherein the transmission configuration parameters comprise a preamble sequence for a random access occasion, an indication of the random access occasion, a payload content, a payload size, a physical uplink channel resource unit, a modulation and coding scheme, a carrier, a frequency spectrum, a beam, a multi-panel or transmission/reception point configuration, a transmission/reception point, or a combination thereof.

32. The method of claim 18, wherein the message indicating the plurality of transmission configuration options comprises system information or radio resource control signaling.

33. The method of claim 18, wherein the random access procedure comprises a two-step random access procedure.

34. An apparatus for wireless communications at a user equipment (UE), comprising:
a processor,
memory coupled with the processor; and
instructions stored in the memory and executable by the processor to cause the apparatus to:
receive, from a base station, a message indicating a plurality of transmission configuration options for retransmitting a first random access message of a random access procedure;
determine to perform a set of retransmissions of the first random access message based at least in part on a retransmission trigger;
identify a transition trigger to transition from a first transmission configuration state to a second transmission configuration state; and
transmit, to the base station, a set of retransmissions of a second random access message according to the second transmission configuration state and based at least in part on the transition trigger, the plurality of transmission configuration options, and the retransmission trigger.

35. The apparatus of claim 34, wherein the instructions are further executable by the processor to cause the apparatus to:
determine to change at least one transmission configuration parameter from a first transmission of the first random access message to the set of retransmissions of the first random access message based at least in part on the plurality of transmission configuration options.

36. The apparatus of claim 35, wherein the instructions are further executable by the processor to cause the apparatus to:
outputting an indication of the determination to change the at least one transmission configuration parameter from the first transmission of the first random access message to the set of retransmissions of the first random access message.

37. The apparatus of claim 34, wherein the instructions are further executable by the processor to cause the apparatus to:
  determine a plurality of transmission configuration states for transmission and retransmission of the first random access message based at least in part on the plurality of transmission configuration options, wherein each transmission configuration state of the plurality of transmission configuration states comprises a set of transmission configuration parameters, and wherein each transmission configuration state of the plurality of transmission configuration states differs by at least one transmission configuration parameter.

38. The apparatus of claim 37, wherein the instructions are further executable by the processor to cause the apparatus to:
  select the first transmission configuration state from the plurality of transmission configuration states for a first transmission of the first random access message;
  transmit, to the base station, the first transmission of the first random access message according to the first transmission configuration state; and
  select the second transmission configuration state from the plurality of transmission configuration states for the retransmission of the first random access message, wherein the retransmission of the first random access message is transmitted according to the second transmission configuration state, wherein the second transmission configuration state is different than the first transmission configuration state.

39. The apparatus of claim 37, wherein the instructions are further executable by the processor to cause the apparatus to:
  select the first transmission configuration state from the plurality of transmission configuration states for a first transmission of the first random access message;
  transmit, to the base station, the first transmission of the first random access message according to the first transmission configuration state, wherein the retransmission of the first random access message is transmitted according to the first transmission configuration state based at least in part on a number of retransmissions of the first random access message being below a threshold number of retransmissions;
  determine to transmit a second retransmission of the first random access message based at least in part on the retransmission trigger;
  select the second transmission configuration state from the plurality of transmission configuration states for the second retransmission, wherein the second transmission configuration state is selected based at least in part on the number of retransmissions of the first random access message exceeding the threshold number of retransmissions; and
  transmit, to the base station, the second retransmission of the first random access message according to the second transmission configuration state based at least in part on the determination to transmit the second retransmission, wherein the second transmission configuration state is different than the first transmission configuration state.

40. The apparatus of claim 37, wherein the at least one transmission configuration parameter comprises a payload size, a modulation and coding scheme, a multiple-input multiple-output antenna configuration, a carrier, a frequency spectrum, a random access occasion index, a physical uplink channel resource unit group index, or a combination thereof.

41. The apparatus of claim 34, wherein the instructions to identify the transition trigger are executable by the processor to cause the apparatus to:
  receive, from the base station, the transition trigger, wherein the transition trigger comprises an indication of a change of system loading information, a change of random access resource allocations, a change in synchronization signal block association rules, a change of inter-cell interference measurement, a change of system information, or a combination thereof.

42. The apparatus of claim 41, wherein the transition trigger is received in radio resource control signaling.

43. The apparatus of claim 34, wherein the instructions to identify the transition trigger are executable by the processor to cause the apparatus to:
  determine to transition from the first transmission configuration state to the second transmission configuration state based at least in part on a variation of a buffer status for the set of retransmissions from a first transmission, a variation of a power headroom value for the set of retransmissions from a first transmission, a quality of service handling for the set of retransmissions, or a combination thereof.

44. The apparatus of claim 34, wherein the instructions to retransmit the first random access message further are executable by the processor to cause the apparatus to:
  transmit, to the base station, an indication of a log of transmission configuration state transitions for transmitting the first random access message, wherein the indication of the log of transmission configuration state transitions comprises transmission configuration parameters used for transmission of the first random access message prior to the set of retransmissions of the first random access message.

45. The apparatus of claim 44, wherein the indication of the log of transmission configuration state transitions is indicated via a state-dependent group hopping of preamble sequences, a state-dependent group hopping of demodulation reference signal sequences, a state-dependent hopping of time-frequency resources used by a random access occasion, a state-dependent hopping of time-frequency resources used by a physical uplink channel resource unit, an uplink control information message, an embedded indication in a payload of the first random access message, or a combination thereof.

46. The apparatus of claim 34, wherein the plurality of transmission configuration options comprises an indication of which transmission configuration parameters are reconfigurable by the UE for the set of retransmissions of the first random access message.

47. The apparatus of claim 46, wherein the transmission configuration parameters comprise a preamble sequence for a random access occasion, an indication of the random access occasion, a payload content, a payload size, a physical uplink channel resource unit, a modulation and coding scheme, a carrier, a frequency spectrum, a beam, a multi-panel or transmission/reception point configuration, a transmission/reception point, or a combination thereof.

48. The apparatus of claim 34, wherein the retransmission trigger comprises not receiving a fallback random access response message within a random access response window, not receiving a success random access response message within the random access response window, a counter of a number of retransmissions of the first random access message being less than or equal to a threshold number of retransmissions, or a combination thereof.

49. The apparatus of claim 34, wherein the message indicating the plurality of transmission configuration options comprises system information or radio resource control signaling.

50. The apparatus of claim 34, wherein the random access procedure comprises a two-step random access procedure.

51. An apparatus for wireless communications at a base station, comprising:
a processor,
memory coupled with the processor; and
instructions stored in the memory and executable by the processor to cause the apparatus to:
transmit, to a user equipment (UE), a message indicating a plurality of transmission configuration options for retransmitting a first random access message of a random access procedure;
receive, from the UE, a set of retransmissions of the first random access message, transmitted according to a first transmission configuration state; and
receive, from the UE, a a set of retransmissions of a second random access message according to a second transmission configuration state and based at least in part on a transmission trigger, the plurality of transmission configuration options and a retransmission trigger.

52. The apparatus of claim 51, wherein the instructions are further executable by the processor to cause the apparatus to:
determine that at least one transmission configuration parameter for the set of retransmissions of the first random access message is different than a corresponding transmission configuration parameter for the set of retransmissions of the second random access message based at least in part on the plurality of transmission configuration options.

53. The apparatus of claim 52, wherein the instructions are further executable by the processor to cause the apparatus to:
receive, from the UE, a second message indicating the at least one transmission configuration parameter for the set of retransmissions of the first random access message that is different than the corresponding transmission configuration parameter for the set of retransmissions of the second random access message.

54. The apparatus of claim 52, wherein the at least one transmission configuration parameter comprises a payload size, a modulation and coding scheme, a multiple-input multiple-output antenna configuration, a carrier, a frequency spectrum, a random access occasion index, a physical uplink channel resource unit group index, or a combination thereof.

55. The apparatus of claim 51, wherein the second transmission configuration state being different by at least one transmission configuration parameter than the first transmission configuration state.

56. The apparatus of claim 51, wherein the set of retransmissions of the first random access message is received according to the first transmission configuration state based at least in part on a number of retransmissions of the first random access message being below a threshold number of retransmissions.

57. The apparatus of claim 56,
wherein the second transmission configuration state is different by at least one transmission configuration parameter than the first transmission configuration state.

58. The apparatus of claim 51, wherein the instructions are further executable by the processor to cause the apparatus to:
transmit, to the UE, a transition trigger to transition from the first transmission configuration state for the set of retransmissions of the first random access message to a second transmission configuration state for the set of retransmissions of a second random access message, wherein the transition trigger comprises an indication of a change of system loading information, a change of random access resource allocations, a change in synchronization signal block association rules, a change of inter-cell interference measurement, a change of system information, or a combination thereof.

59. The apparatus of claim 58, wherein the transition trigger is transmitted in radio resource control signaling.

60. The apparatus of claim 51, wherein the instructions to receive the retransmission of the first random access message further are executable by the processor to cause the apparatus to:
receive, from the UE, an indication of a log of transmission configuration state transitions the UE used for transmitting the first random access message, wherein the indication of the log of transmission configuration state transitions comprises transmission configuration parameters the UE used for the set of retransmission of the first random access message prior to the set of retransmissions of a second random access message.

61. The apparatus of claim 60, wherein the instructions are further executable by the processor to cause the apparatus to:
combine at least a subset of the set of retransmissions of the first random access message based at least in part on the indication of the log of transmission configuration state transitions.

62. The apparatus of claim 60, wherein the indication of the log of transmission configuration state transitions is indicated via a state-dependent group hopping of preamble sequences, a state-dependent group hopping of demodulation reference signal sequences, a state-dependent hopping of time-frequency resources used by a random access occasion, a state-dependent hopping of time-frequency resources used by a physical uplink channel resource unit, an uplink control information message, an embedded indication in a payload of the first random access message, or a combination thereof.

63. The apparatus of claim 51, wherein the plurality of transmission configuration options comprises an indication of which transmission configuration parameters are reconfigurable by the UE for the set of retransmissions of the first random access message.

64. The apparatus of claim 63, wherein the transmission configuration parameters comprise a preamble sequence for a random access occasion, an indication of the random access occasion, a payload content, a payload size, a physical uplink channel resource unit, a modulation and coding scheme, a carrier, a frequency spectrum, a beam, a multi-panel or transmission/reception point configuration, a transmission/reception point, or a combination thereof.

65. The apparatus of claim 51, wherein the message indicating the plurality of transmission configuration options comprises system information or radio resource control signaling.

66. The apparatus of claim 51, wherein the random access procedure comprises a two-step random access procedure.

67. An apparatus for wireless communications at a user equipment (UE), comprising:
- means for receiving, from a base station, a message indicating a plurality of transmission configuration options for retransmitting a first random access message of a random access procedure;
- means for determining to perform a set of retransmissions of the first random access message based at least in part on a retransmission trigger;
- means for identifying a transition trigger to transition from a first transmission configuration state to a second transmission configuration state; and
- means for transmitting, to the base station, a set of retransmissions of a second random access message according to the second transmission configuration state and based at least in part on the transition trigger, the plurality of transmission configuration options, and the retransmission trigger.

68. An apparatus for wireless communications at a base station, comprising:
- means for transmitting, to a user equipment (UE), a message indicating a plurality of transmission configuration options for retransmitting a first random access message of a random access procedure;
- means for receiving, from the UE, a set of retransmissions of the first random access message, transmitted according to a first transmission configuration state; and
- means for receiving, from the UE, a a set of retransmissions of a second random access message according to a second transmission configuration state and based at least in part on a transmission trigger, the plurality of transmission configuration options and a retransmission trigger.

69. A non-transitory computer-readable medium storing code for wireless communications at a user equipment (UE), the code comprising instructions executable by a processor to:
- receive, from a base station, a message indicating a plurality of transmission configuration options for retransmitting a first random access message of a random access procedure;
- determine to perform a set of retransmissions of the first random access message based at least in part on a retransmission trigger;
- identify a transition trigger to transition from a first transmission configuration state to a second transmission configuration state; and
- transmit, to the base station, a set of retransmissions of a second random access message according to the second transmission configuration state and based at least in part on the transition trigger, the plurality of transmission configuration options, and the retransmission trigger.

70. A non-transitory computer-readable medium storing code for wireless communications at a base station, the code comprising instructions executable by a processor to:
- transmit, to a user equipment (UE), a message indicating a plurality of transmission configuration options for retransmitting a first random access message of a random access procedure;
- receive, from the UE, a set of retransmissions of the first random access message, transmitted according to a first transmission configuration state; and
- receive, from the UE, a a set of retransmissions of a second random access message according to a second transmission configuration state and based at least in part on a transmission trigger, the plurality of transmission configuration options and a retransmission trigger.

* * * * *